United States Patent
Mansour et al.

(10) Patent No.: US 11,222,647 B2
(45) Date of Patent: Jan. 11, 2022

(54) CASCADE ECHO CANCELLATION FOR ASYMMETRIC REFERENCES

(71) Applicant: Amazon Technologies, Inc., Seattle, WA (US)

(72) Inventors: Mohamed Mansour, Cupertino, CA (US); Shobha Devi Kuruba Buchannagari, Fremont, CA (US)

(73) Assignee: Amazon Technologies, Inc., Seattle, WA (US)

(*) Notice: Subject to any disclaimer, the term of this patent is extended or adjusted under 35 U.S.C. 154(b) by 10 days.

(21) Appl. No.: 16/934,668

(22) Filed: Jul. 21, 2020

(65) Prior Publication Data

US 2021/0134313 A1    May 6, 2021

Related U.S. Application Data

(63) Continuation of application No. 16/669,980, filed on Oct. 31, 2019, now Pat. No. 10,811,029.

(51) Int. Cl.
| | | |
|---|---|---|
| *H04B 15/00* | (2006.01) | |
| *H04R 3/02* | (2006.01) | |
| *G10L 21/0232* | (2013.01) | |
| *G10L 25/21* | (2013.01) | |
| *G10L 25/51* | (2013.01) | |
| *G10L 15/22* | (2006.01) | |
| *G10L 15/08* | (2006.01) | |
| *G10L 21/0208* | (2013.01) | |

(52) U.S. Cl.
CPC .......... *G10L 21/0232* (2013.01); *G10L 25/21* (2013.01); *G10L 25/51* (2013.01); *G10L 15/08* (2013.01); *G10L 15/22* (2013.01); *G10L 2015/088* (2013.01); *G10L 2015/223* (2013.01); *G10L 2021/02082* (2013.01)

(58) Field of Classification Search
CPC .......... H04M 9/082; H04M 9/08; H04B 3/23; G10L 21/02
USPC .............................................. 381/93, 95, 96
See application file for complete search history.

(56) References Cited

U.S. PATENT DOCUMENTS

| | | | |
|---|---|---|---|
| 2006/0007872 A1* | 1/2006 | Liu .......................... | H04B 3/23 370/286 |
| 2006/0018459 A1* | 1/2006 | McCree ................ | H04M 9/082 379/406.06 |
| 2011/0091031 A1* | 4/2011 | Taniguchi ............. | H04M 9/082 379/406.08 |

(Continued)

*Primary Examiner* — George C Monikang
(74) *Attorney, Agent, or Firm* — Pierce Atwood LLP

(57) ABSTRACT

A system configured to perform cascade echo cancellation processing to improve a performance when reference signals are asymmetric (e.g., dominant reference signal(s) overshadow weak reference signal(s)). The system may perform cascade echo cancellation processing to separately adapt filter coefficients between the dominant reference signal(s) and the weak reference signal(s). For example, the system may use a dominant reference signal to process a microphone audio signal and generate a residual audio signal, using the residual audio signal to adapt first filter coefficient values corresponding to the dominant reference signal. Separately, the system may use a weak reference signal to process the residual audio signal and generate an output audio signal, using the output audio signal to adapt second filter coefficient values corresponding to the weak reference signal.

20 Claims, 15 Drawing Sheets

(56) References Cited

U.S. PATENT DOCUMENTS

2018/0115650 A1* 4/2018 Suzuki .................. H04M 3/40

* cited by examiner

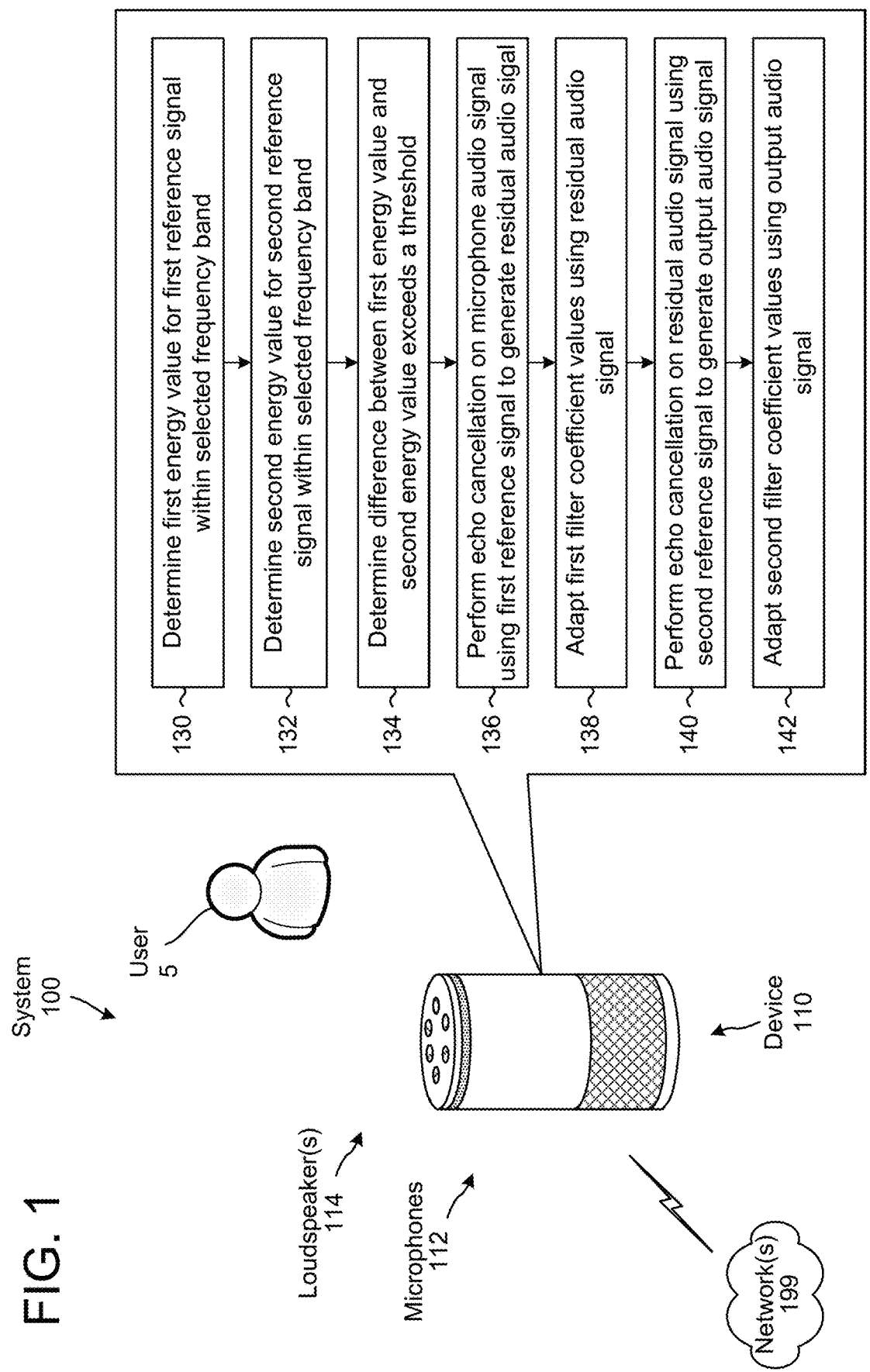

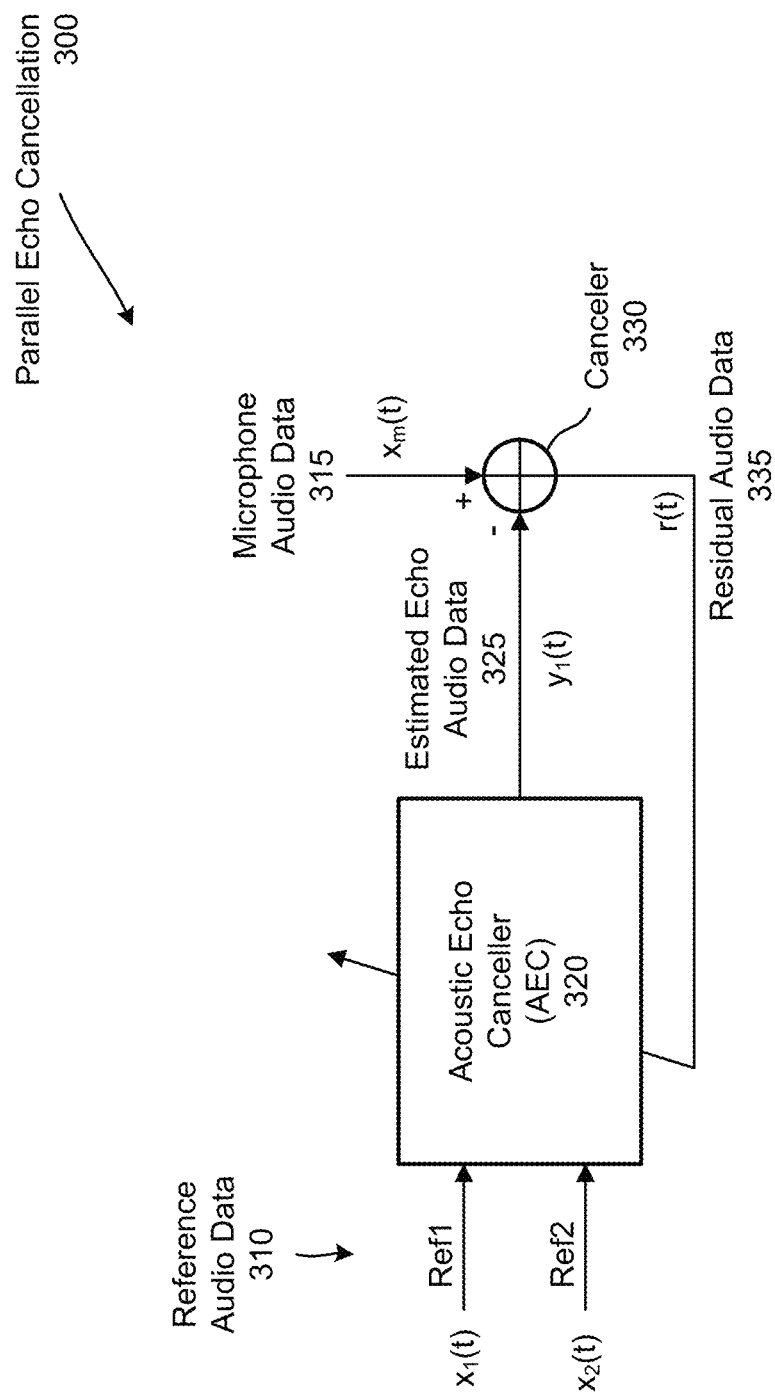

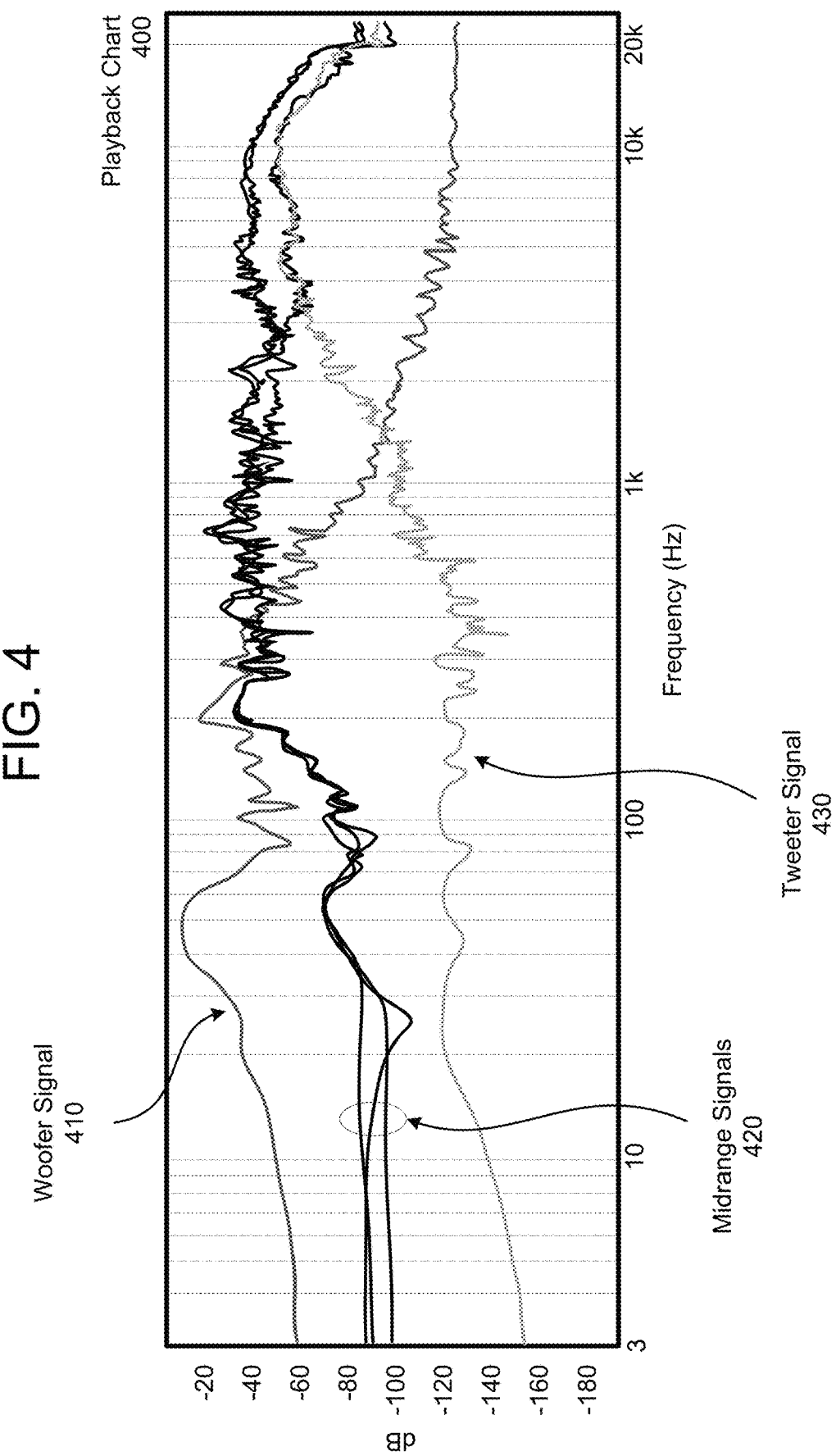

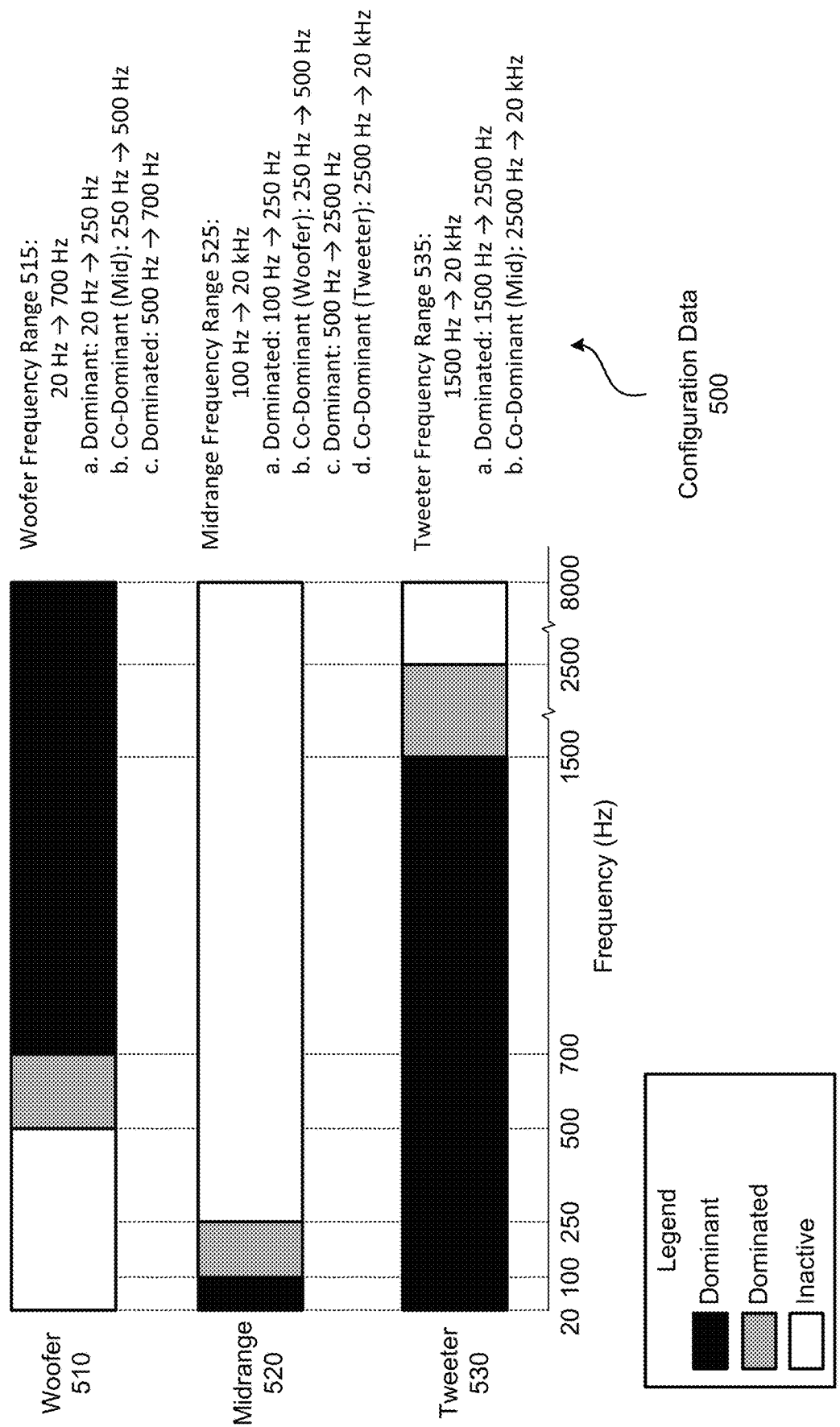

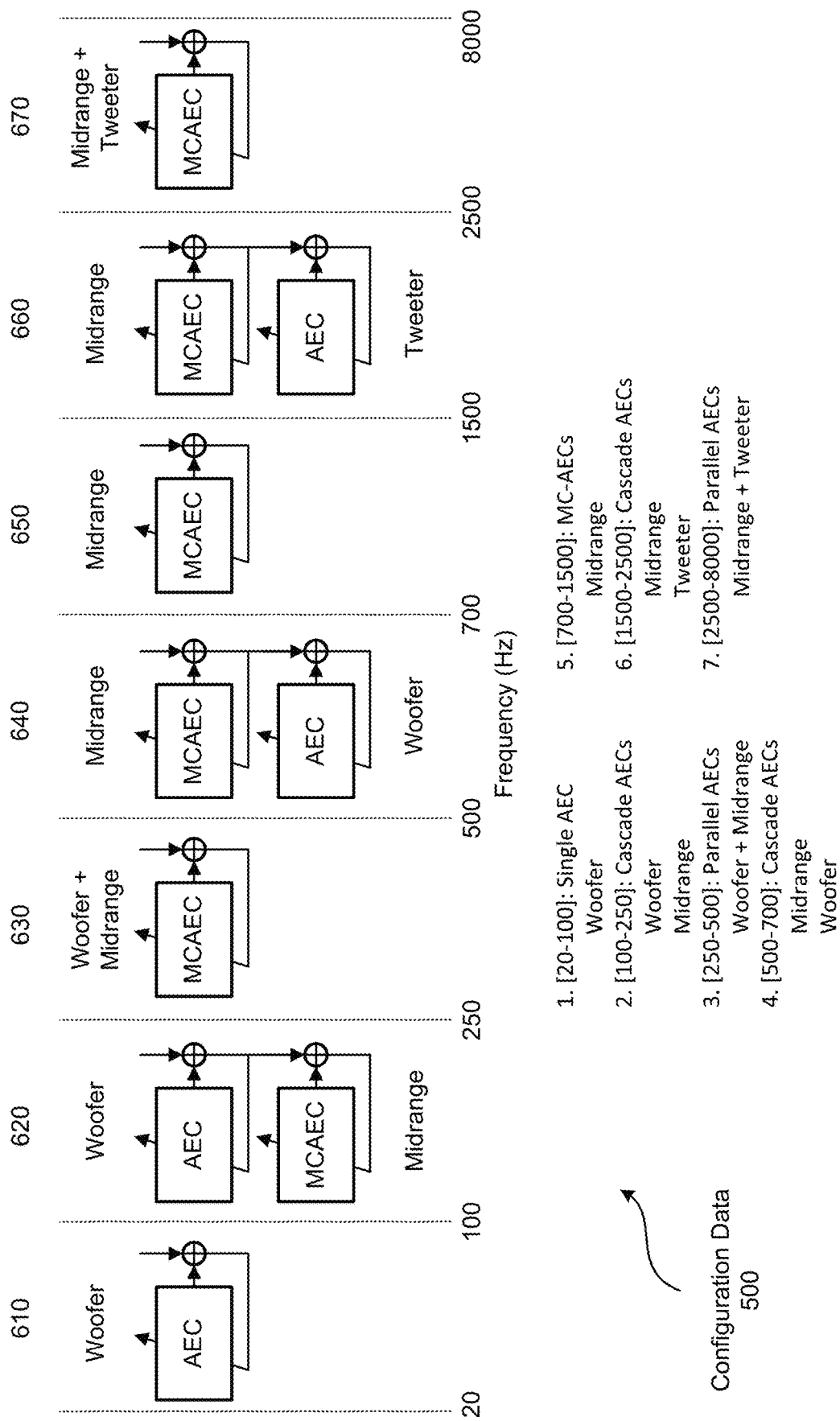

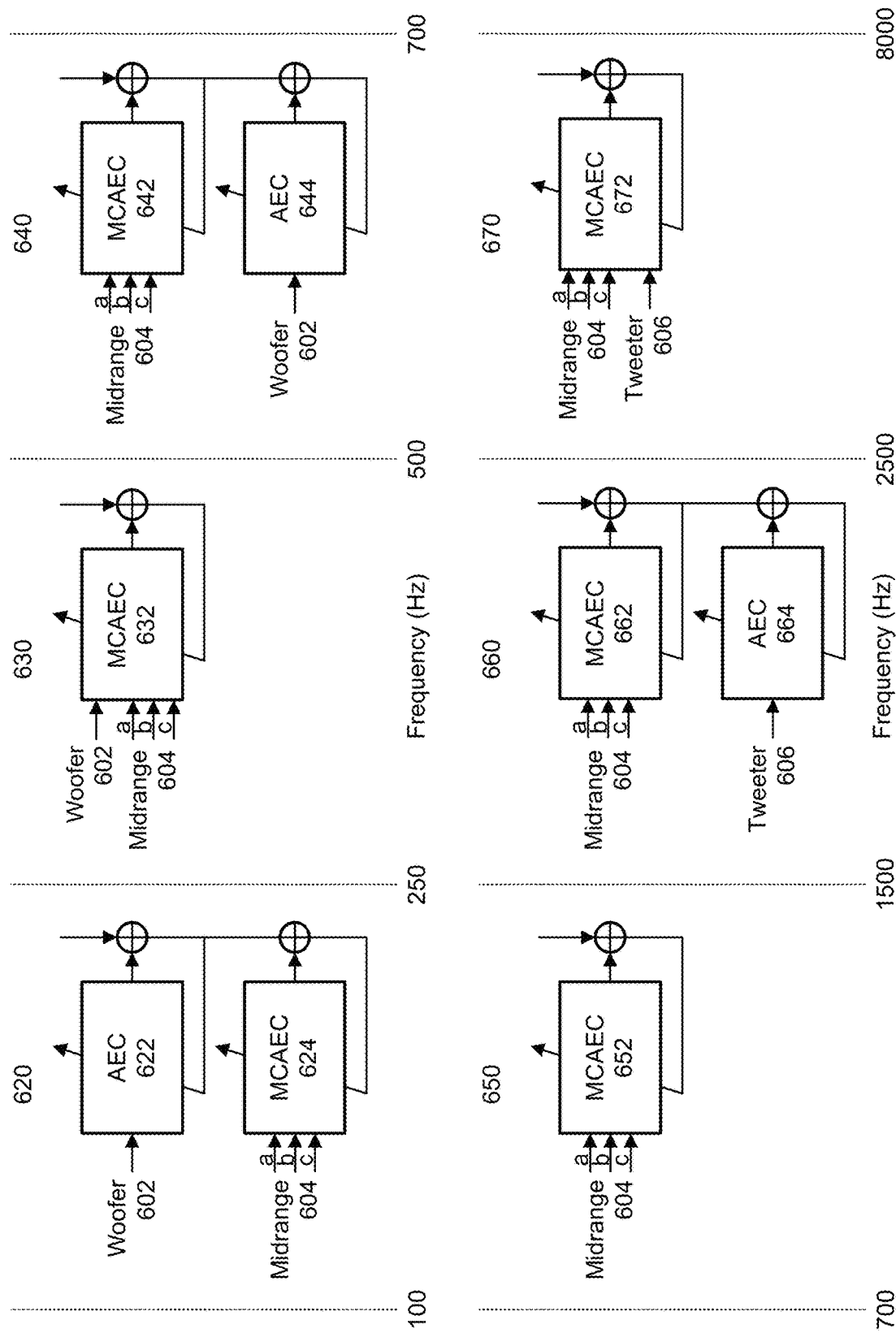

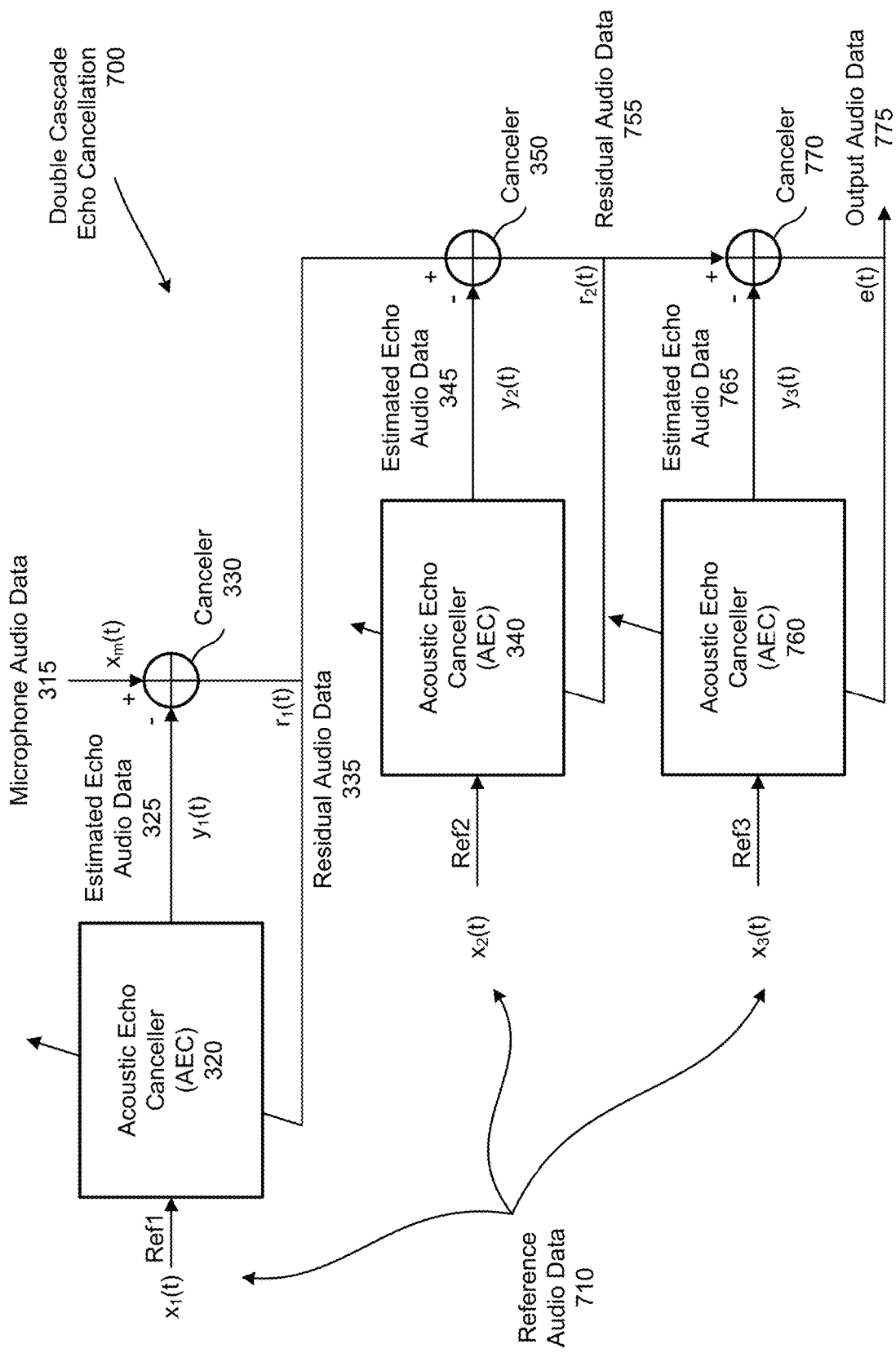

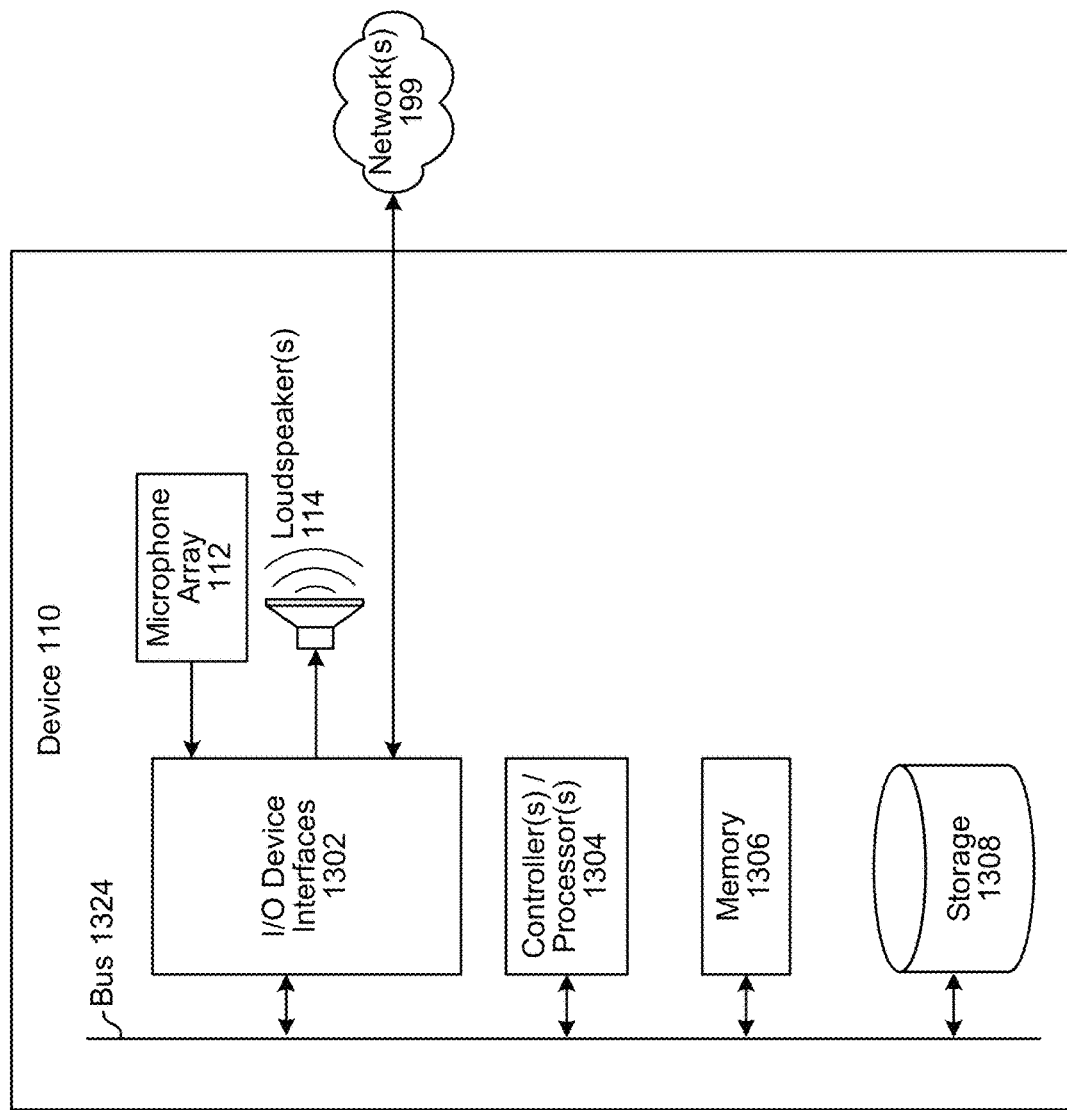

CASCADE ECHO CANCELLATION FOR ASYMMETRIC REFERENCES

CROSS-REFERENCE TO RELATED APPLICATION

This application is a continuation of, and claims priority to, U.S. patent application Ser. No. 16/669,980, entitled "CASCADE ECHO CANCELLATION FOR ASYMMETRIC REFERENCES," filed on Oct. 31, 2019, in the names of Mohamed Mansour, et al. The above application is hereby incorporated by reference in its entirety.

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIGS. 3A-3B illustrate examples of parallel echo cancellation and cascade echo cancellation according to embodiments of the present disclosure.

FIG. 4 illustrates example reference audio signals according to embodiments of the present disclosure.

FIG. 5 illustrates examples of relative energy values within different frequency ranges according to embodiments of the present disclosure.

FIGS. 6A-6B illustrate examples of echo cancellation configurations within different frequency ranges according to embodiments of the present disclosure.

FIG. 7 illustrates examples of double cascade echo cancellation according to embodiments of the present disclosure.

FIG. 13 is a block diagram conceptually illustrating example components of a system according to embodiments of the present disclosure.

DETAILED DESCRIPTION

Figure 2A:
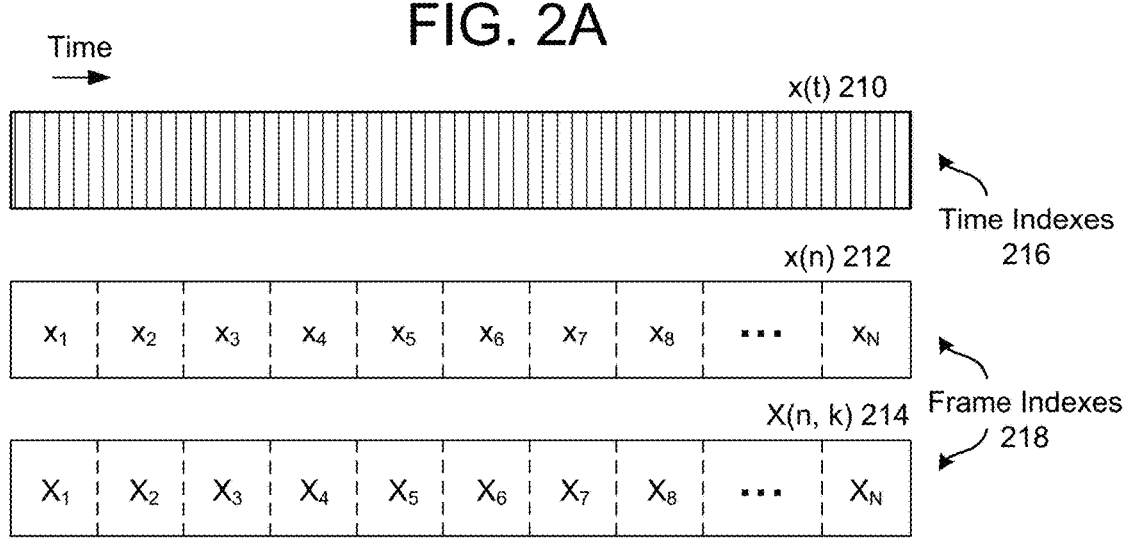
FIGS. 2A-2C illustrate examples of frame indexes, tone indexes, and channel indexes.

Electronic devices may be used to capture and process audio data. The audio data may be used for voice commands and/or may be output by loudspeakers as part of a communication session. In some examples, loudspeakers may generate audio using playback audio data while a microphone generates local audio data. An electronic device may perform audio processing, such as acoustic echo cancellation (AEC), to remove an "echo" signal corresponding to the playback audio data from the local audio data, isolating local speech to be used for voice commands and/or the communication session.

In some examples, the device may perform multi-channel echo cancellation processing to remove one or more reference signals from one or more microphone signals. However, when reference signals are asymmetric (e.g., dominant reference signal(s) overshadow weak reference signal(s)), a performance of traditional multi-channel echo cancellation degrades.

To improve a performance of echo cancellation and/or improve an audio quality of an output audio signal when energies of the reference signals are asymmetric, devices, systems and methods are disclosed that perform cascade echo cancellation processing to separately adapt filter coefficients between the dominant reference signal(s) and the weak reference signal(s). For example, the system may process a microphone audio signal using a first echo canceller component in order to generate a residual audio signal, and may process the residual audio signal using a second echo canceller component in order to generate an output audio signal. The first echo canceller component may use the dominant reference signal and first filter coefficient values to remove a first portion of echo corresponding to the dominant reference signal and may then use the residual audio signal to adapt the first filter coefficient values. Separately, the second echo canceller component may use the weak reference signal and second filter coefficient values to remove a second portion of echo corresponding to the weak reference signal and may then use the output audio signal to adapt the second filter coefficient values. By removing the first echo prior to adapting the second filter coefficient values, the second echo canceller component may adapt the second filter coefficient values with more precision than if the device 110 attempted to adapt both the first filter coefficient values and the second filter coefficient values simultaneously using a multi-channel echo canceller component.

FIG. 1 illustrates a system configured to perform cascade echo cancellation processing for asymmetric reference signals according to embodiments of the present disclosure. For example, the system 100 may be configured to receive or generate microphone audio signals and perform echo cancellation to generate an output audio signal representing desired speech. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include microphones 112 in a microphone array and/or one or more loudspeaker(s) 114. However, the disclosure is not limited thereto and the device 110 may include additional components without departing from the disclosure. While FIG. 1 illustrates the loudspeaker(s) 114 being internal to the device 110, the disclosure is not limited thereto and the loudspeaker(s) 114 may be external to the device 110 without departing from the disclosure. For example, the loudspeaker(s) 114 may be separate from the device 110 and connected to the device 110 via a wired connection and/or a wireless connection without departing from the disclosure.

The device 110 may be an electronic device configured to send audio data to and/or receive audio data. For example, the device 110 (e.g., local device) may receive playback audio data $x_r(t)$ (e.g., far-end reference audio data) from a remote device and the playback audio data $x_r(t)$ may include remote speech, music, and/or other output audio. In some examples, the user 5 may be listening to music or a program and the playback audio data $x_r(t)$ may include the music or other output audio (e.g., talk-radio, audio corresponding to a broadcast, text-to-speech output, etc.). However, the disclosure is not limited thereto and in other examples the user 5 may be involved in a communication session (e.g., conversation between the user 5 and a remote user local to the remote device) and the playback audio data $x_r(t)$ may include remote speech originating at the remote device. In both examples, the device 110 may generate output audio corresponding to the playback audio data $x_r(t)$ using the one or more loudspeaker(s) 114. While generating the output audio, the device 110 may capture microphone audio data $x_m(t)$ (e.g., input audio data) using the microphones 112. In addition to capturing desired speech (e.g., the microphone audio data includes a representation of local speech from a user 5), the device 110 may capture a portion of the output audio generated by the loudspeaker(s) 114 (including a portion of the music and/or remote speech), which may be referred to as an "echo" or echo signal, along with additional acoustic noise (e.g., undesired speech, ambient acoustic noise in an environment around the device 110, etc.), as discussed in greater detail below.

In some examples, the microphone audio data $x_m(t)$ may include a voice command directed to a remote system, which may be indicated by a keyword (e.g., wakeword). For example, the device 110 detect that the wakeword is represented in the microphone audio data $x_m(t)$ and may send the microphone audio data $x_m(t)$ to the remote system. Thus, the remote system may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the remote system may perform Automatic Speech Recognition (ASR) processing, Natural Language Understanding (NLU) processing and/or command processing. The voice commands may control the device 110, audio devices (e.g., play music over loudspeaker(s) 114, capture audio using microphones 112, or the like), multimedia devices (e.g., play videos using a display, such as a television, computer, tablet or the like), smart home devices (e.g., change temperature controls, turn on/off lights, lock/unlock doors, etc.) or the like.

Additionally or alternatively, in some examples the device 110 may send the microphone audio data $x_m(t)$ to the remote device as part of a Voice over Internet Protocol (VoIP) communication session or the like. For example, the device 110 may send the microphone audio data $x_m(t)$ to the remote device either directly or via remote system and may receive the playback audio data $x_r(t)$ from the remote device either directly or via the remote system. During the communication session, the device 110 may also detect the keyword (e.g., wakeword) represented in the microphone audio data $x_m(t)$ and send a portion of the microphone audio data $x_m(t)$ to the remote system in order for the remote system to determine a voice command.

Prior to sending the microphone audio data $x_m(t)$ to the remote device/remote system, the device 110 may perform audio processing to isolate local speech captured by the microphones 112 and/or to suppress unwanted audio data (e.g., echoes and/or noise). For example, the device 110 may perform acoustic echo cancellation (AEC) to isolate speech or other desired input audio. Additionally or alternatively, the device 110 may perform beamforming (e.g., operate microphones 112 using beamforming techniques), adaptive interference cancellation (AIC), residual echo suppression (RES), and/or other audio processing without departing from the disclosure.

To improve a performance of echo cancellation and/or improve an audio quality of an output audio signal when energies of the reference signals are asymmetric (e.g., dominant reference signal(s) overshadow weak reference signal(s)), the device 110 may use cascade echo cancellation processing to process the dominant reference signal(s) separately from the weak reference signal(s). For example, the device 110 may use cascaded echo canceller components to improve the performance of echo cancellation when a second reference signal is noticeably weaker than a first reference signal, enabling the echo canceller components to separately adapt filter coefficients values. To illustrate an example, a first echo canceller component may use the dominant reference signal and first filter coefficient values to process a microphone audio signal in order to generate a residual audio signal, thus removing a first portion of echo corresponding to the dominant reference signal. The first echo canceller component may then use the residual audio signal to adapt the first filter coefficient values. Separately, a second echo canceller component may use the weak reference signal and second filter coefficient values to process the residual audio signal in order to generate an output audio signal, thus removing a second portion of echo corresponding to the weak reference signal. The second echo canceller component may then use the output audio signal to adapt the second filter coefficient values with more precision than if the device 110 attempted to adapt both the first filter coefficient values and the second filter coefficient values simultaneously using a multi-channel echo canceller component.

The device 110 may receive reference audio signals corresponding to the playback audio data. For example, the device 110 may receive five separate channels corresponding to five loudspeakers 114a-114e, although the disclosure is not limited thereto. The device 110 may also receive a microphone audio signal from a microphone 112 of the device 110. For ease of illustration, the following description will refer to the device 110 receiving a single microphone audio signal. However, the disclosure is not limited thereto and the steps illustrated in FIG. 1 may be applied to multiple microphone audio signals without departing from the disclosure.

As illustrated in FIG. 1 and described in greater detail below, the device 110 may determine (130) a first energy value for a first reference signal within a selected frequency band, may determine (132) a second energy value for a second reference signal within the selected frequency band, and determine (134) that a difference between the first energy value and the second energy value exceeds a difference threshold value. For example, the device 110 may determine a first energy value (e.g., −40 dB) associated with a portion of a woofer audio signal that is within a first frequency band (e.g., 125 Hz to 187.5 Hz), determine a second energy value (e.g., −70 dB) associated with a portion of a midrange audio signal that is within the first frequency band, determine a difference between the first energy value and the second energy value (e.g., 30 dB), and determine that the difference exceeds the difference threshold value (e.g., 10 dB). As a result of determining that the difference exceeds the difference threshold value, the device 110 may implement cascade echo cancellation processing to separately adapt a first plurality of filter coefficient values associated with the first reference signal and a second plurality of filter coefficient values associated with the second reference signal.

The device 110 may perform (136) first echo cancellation processing on the microphone audio signal to generate a first estimated echo signal and a residual audio signal. For example, the device 110 may perform first AEC processing by multiplying the first plurality of filter coefficients values by the first reference audio signal (e.g., woofer audio signal) to generate the first estimated echo signal. The first estimated echo signal may correspond to an estimate of a first portion of the echo signal y(t) received by the microphone 112 that corresponds to first output audio generated by the first loudspeaker (e.g., woofer). The device 110 may then subtract the first estimated echo signal from the microphone audio signal to generate the residual audio signal. Thus, the first AEC processing may remove and/or reduce portions of the echo signal that correspond to the first output audio.

As part of performing the first AEC processing, the device 110 may adapt (138) the first plurality of filter coefficient values that are associated with the first reference signal, as described in greater detail below with regard to FIGS. 3A-3B. For example, the device 110 may use the residual audio signal to update the first plurality of filter coefficients in order to minimize an error signal (e.g., difference between the microphone audio signal and the reference audio signal).

The device 110 may perform (140) second echo cancellation processing on the residual audio signal to generate a second estimated echo signal and an output audio signal. For example, the device 110 may perform second AEC processing by multiplying the second plurality of filter coefficients values by the second reference audio signal (e.g., midrange audio signal) to generate the second estimated echo signal. The second estimated echo signal may correspond to an estimate of a second portion of the echo signal y(t) received by the microphone 112 that corresponds to second output audio generated by the second loudspeaker (e.g., midrange). The device 110 may then subtract the second estimated echo signal from the residual audio signal to generate the output audio signal. Thus, the second AEC processing may remove and/or reduce portions of the echo signal that correspond to the second output audio.

As part of performing the second AEC processing, the device 110 may adapt (142) the second plurality of filter coefficient values that are associated with the second reference signal, as described in greater detail below with regard to FIGS. 3A-3B. For example, the device 110 may use the output audio signal to update the second plurality of filter coefficients in order to minimize an error signal (e.g., difference between the residual audio signal and the reference audio signal). Thus, the device 110 updates the first plurality of filter coefficient values separately from the second plurality of filter coefficient values, which improves a performance of the echo cancellation processing as the second reference signal is not overshadowed by the first reference signal.

While FIG. 1 illustrates a single example involving two reference signals, the disclosure is not limited thereto and the device 110 may perform these steps for three or more reference signals without departing from the disclosure. For example, instead of a single midrange audio signal, the device 110 may process multiple midrange audio signals in parallel without departing from the disclosure. Additionally or alternatively, the device 110 may perform these steps for each individual frequency band and/or frequency range. For example, the device 110 may compare energy values for a first number (e.g., 512) of individual frequency bands and may group the reference audio signals into a second number (e.g., 7) of individual frequency ranges, as described below with regard to FIGS. 4-5.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) interchangeably without departing from the disclosure. For example, some audio data may be referred to as playback audio data $x_r(t)$, microphone audio data $x_m(t)$, error audio data m(t), output audio data r(t), and/or the like. Additionally or alternatively, this audio data may be referred to as audio signals such as a playback signal $x_r(t)$, microphone signal $x_m(t)$, error signal m(t), output audio data r(t), and/or the like without departing from the disclosure.

Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, audio data may be captured by the microphones 112 in the time-domain. However, the device 110 may convert the audio data to the frequency-domain or subband-domain in order to perform beamforming, acoustic echo cancellation (AEC) processing, and/or additional audio processing without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the playback audio data may be referred to as far-end reference audio data, reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphones 112 prior to the device 110 performing audio processing such as AEC processing or beamforming. The microphone audio data $x_m(t)$ may include local speech s(t) (e.g., an utterance, such as near-end speech generated by the user 5), an "echo" signal y(t) (e.g., portion of the playback audio $x_r(t)$ captured by the microphones 112), acoustic noise n(t) (e.g., ambient noise in an environment around the device 110), and/or the like. As the microphone audio data is captured by the microphones 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal y(t) corresponds to a portion of the playback audio that reaches the microphones 112 (e.g., portion of audible sound(s) output by the loudspeaker(s) 114 that is recaptured by the microphones 112) and may be referred to as an echo or echo data y(t).

Isolated audio data corresponds to audio data after the device 110 performs echo cancellation processing to isolate the local speech s(t). For example, isolated audio data corresponds to the microphone audio data $x_m(t)$ after subtracting the reference signal(s) (e.g., using AEC processing). As noted above, the isolated audio data may be referred to as isolated audio signal(s) without departing from the disclosure, and one of skill in the art will recognize that audio data output by an AEC component may also be referred to as an error audio data e(t), error signal e(t) and/or the like.

Figure 2B:
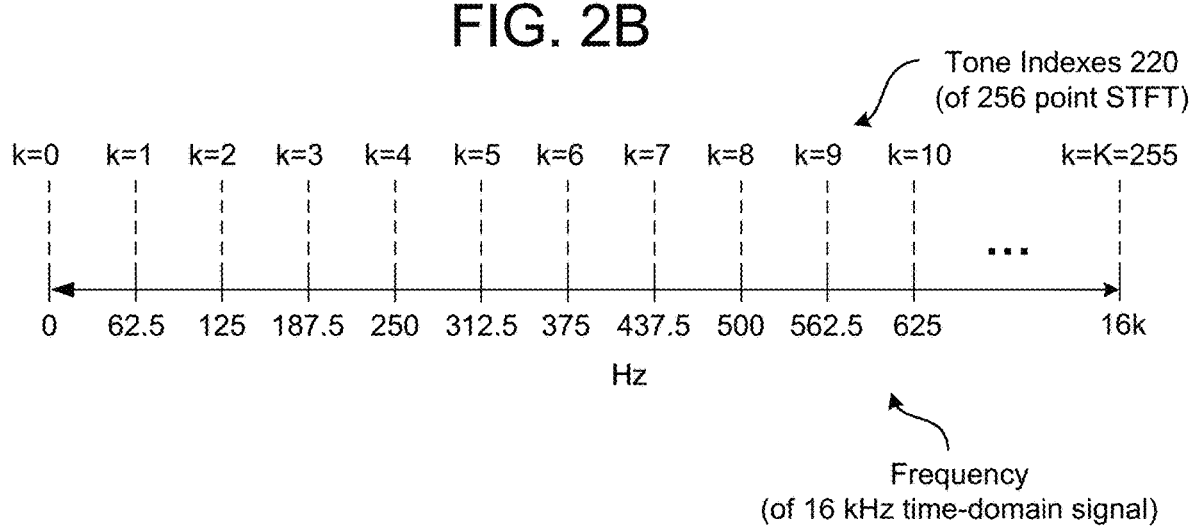
Figure 2C:
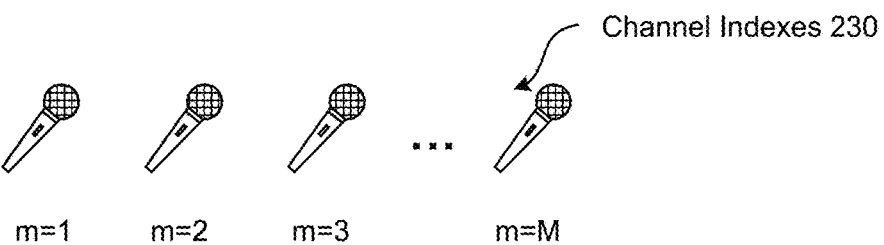

FIGS. 2A-2C illustrate examples of frame indexes, tone indexes, and channel indexes. As described above, the device 110 may generate microphone audio data $x_m(t)$ using microphones 112. For example, a first microphone 112a may generate first microphone audio data $x_{m1}(t)$ in a time domain, a second microphone 112b may generate second microphone audio data $x_{m2}(t)$ in the time domain, and so on. As illustrated in FIG. 2A, a time domain signal may be represented as microphone audio data x(t) 210, which is comprised of a sequence of individual samples of audio data. Thus, x(t) denotes an individual sample that is associated with a time t.

While the microphone audio data x(t) 210 is comprised of a plurality of samples, in some examples the device 110 may group a plurality of samples and process them together. As illustrated in FIG. 2A, the device 110 may group a number of samples together in a frame to generate microphone audio data x(n) 212. As used herein, a variable x(n) corresponds to the time-domain signal and identifies an individual frame (e.g., fixed number of samples s) associated with a frame index n.

Additionally or alternatively, the device 110 may convert microphone audio data x(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) 214 in the frequency domain or the subband domain. As used herein, a variable X(n, k) corresponds to the frequency-domain signal and identifies an individual frame associated with frame index n and tone index k. As illustrated in FIG. 2A, the microphone audio data x(t) 212 corresponds to time indexes 216, whereas the microphone audio data x(n) 212 and the microphone audio data X(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data x(t) 210) and frame indexes 218 (e.g., microphone audio data x(n) 212 in the time domain and microphone audio data X(n, k) 216 in the frequency domain). For example, the system 100 may apply FFT processing to the time-domain microphone audio data x(n) 212, producing the frequency-domain microphone audio data X(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different subbands (e.g., tone indexes), the disclosure is not limited thereto and the system 100 may divide the frequency range into K different subbands (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

The system 100 may include multiple microphones 112, with a first channel m corresponding to a first microphone 112a, a second channel (m+1) corresponding to a second microphone 112b, and so on until a final channel (MP) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

While FIGS. 2A-2C are described with reference to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, the device 110 may first perform time-alignment to align the playback audio data $x_r(n)$ with the microphone audio data $x_m(n)$. For example, due to nonlinearities and variable delays associated with sending the playback audio data $x_r(n)$ to the loudspeaker(s) 114 using a wireless connection, the playback audio data $x_r(n)$ is not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$ (e.g., adjust for propagation delay), may add/subtract samples and/or frames from the playback audio data $x_r(n)$ (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

Figure 3B:
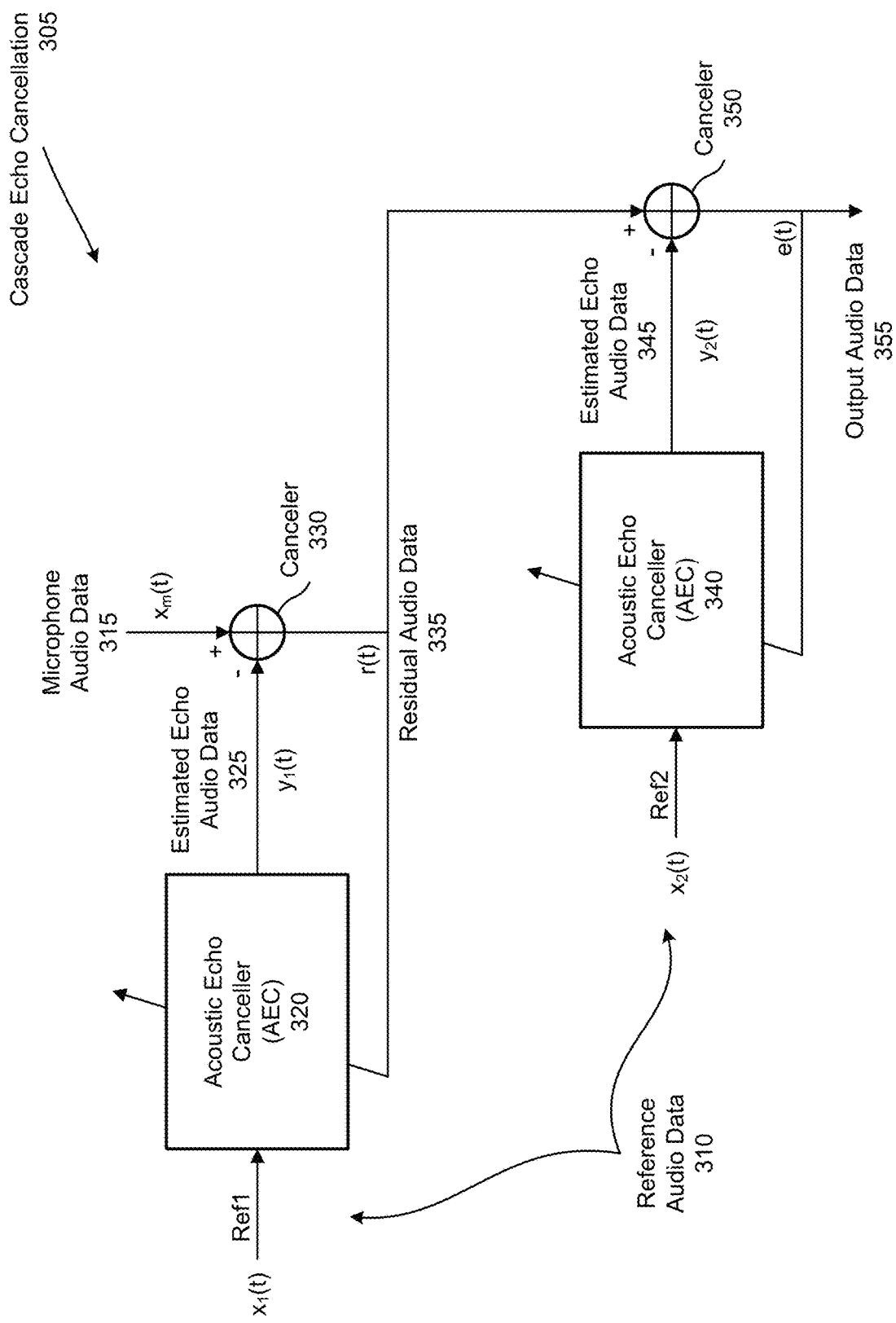

FIGS. 3A-3B illustrate examples of parallel echo cancellation and cascade echo cancellation according to embodiments of the present disclosure. As illustrated in FIG. 3A, parallel echo cancellation 300 is a single-stage process performed by a first acoustic echo canceller (AEC) component 320. For example, the first AEC component 320 may perform echo cancellation using multiple reference signals and perform filter adaptation processing to update (e.g., adapt) a plurality of filter coefficient values corresponding to the multiple reference signals at the same time.

In contrast, FIG. 3B illustrates that cascade echo cancellation 305 is a multi-stage process performed by the first AEC component 320 and at least a second AEC components 340. For example, the first AEC component 320 may perform first echo cancellation processing using a first reference signal and perform first filter adaptation processing to update a first plurality of filter coefficient values corresponding to the first reference signal, while the second AEC component 340 may perform second echo cancellation processing using a second reference signal and perform second filter adaptation processing to update a second plurality of filter coefficient values corresponding to the second reference signal. Thus, the first AEC component 320 updates the first plurality of filter coefficient values separately from the second AEC component 340 updating the second plurality of filter coefficient values.

Using the cascade echo cancellation 305 may improve a performance of the device 110 and/or improve an audio quality of an output audio signal when energies of the reference signals are asymmetric (e.g., dominant reference signals overshadow weak reference signals). For example, the cascade echo cancellation 305 illustrated in FIG. 3B improves the performance of the device when the second reference signal is noticeably weaker than the first reference signal, as the second AEC component 340 operates on the residual audio signal generated by the first AEC component 320 after removing a first echo signal corresponding to the first reference signal. This enables the second AEC component 340 to perform filter adaptation of the second plurality of filter coefficient values using isolated error data that is not overshadowed by the first echo signal.

For ease of illustration, FIGS. 3A-3B do not distinguish between single-channel AEC components and multi-channel AEC (MCAEC) components, referring to echo cancellation components as AEC components regardless of the number of reference signals. For example, the first AEC component 320 is illustrated in FIG. 3A as including multiple reference signals, in which case one of skill in the art may refer to the first AEC component 320 as a MCAEC component, while the first AEC component 320 is illustrated in FIG. 3B as only including a single reference signal. As each stage of the cascade echo cancellation 305 may include one or more reference signals, the first AEC component 320 and/or the second AEC component 340 may include a single reference signal or multiple reference signals without departing from the disclosure. For example, the device 110 may determine a number of stages (e.g., single-stage canceller, double-stage canceller, triple-stage canceller, etc.) and select a number of reference signals to associate with each stage independently for each individual frequency range without departing from the disclosure.

As illustrated in FIG. 3A, the first AEC component 320 may receive reference audio data $x_r(t)$ 310 comprising two different reference signals (e.g., first reference Ref1 $x_1(t)$ and second reference Ref2 $x_2(t)$), although the disclosure is not limited thereto and the first AEC component 320 may receive any number of reference signals without departing from the disclosure. The first AEC component 320 may generate first estimated echo audio data $y_1(t)$ 325 corresponding to an estimate of a first echo signal received by the microphone(s) 112. For example, the first AEC component 320 may include AEC adaptive filter coefficients and may perform adaptation processing to update (e.g., adapt) the AEC filter coefficient values. The first AEC component 320 may include one AEC filter coefficient value for each reference signal and each frequency band ω, although the disclosure is not limited thereto. For example, if the device 110 converts from the time domain to the frequency domain using 256 different frequency bands, the first AEC component 320 may include 512 AEC filter coefficient values, although the disclosure is not limited thereto.

Using the AEC filter coefficient values, the first AEC component 320 may generate the first estimated echo audio data 325 by multiplying each individual AEC filter coefficient value by a corresponding portion of a respective reference signal. For example, a first AEC filter coefficient value may be associated with a first portion of the first reference signal Ref1 $x_1(t)$ that is within a first frequency band $\omega_1$, a second AEC filter coefficient value may be associated with a second portion of the first reference signal Ref1 $x_1(t)$ that is within a second frequency band $\omega_2$, a third AEC filter coefficient value may be associated with a first portion of the second reference signal Ref2 $x_2(t)$ that is within the first frequency band $\omega_1$, and so on.

An individual microphone 112 may generate microphone audio data $x_m(t)$ 315 and a canceler component 330 may subtract the first estimated echo audio data $y_r(t)$ 325 from the microphone audio data $x_m(t)$ 315 to generate residual audio data r(t) 335. Thus, the device 110 may perform echo cancellation to remove the estimated echo from the microphone audio data 315 and generate the residual audio data r(t) 335. While FIG. 3A illustrates the canceler component 330 separate from the first AEC component 320, the disclosure is not limited thereto and the first AEC component 320 may include the canceler component 330 without departing from the disclosure. The first AEC component 320 may then use the residual audio data 335 to perform adaptation processing to update the AEC filter coefficient values corresponding to both the first reference Ref1 $x_1(t)$ and second reference Ref2 $x_2(t)$.

As illustrated in FIG. 3B, during cascade echo cancellation 305 the first AEC component 320 may receive a first portion of the reference audio data $x_r(t)$ 310 (e.g., first reference Ref1 $x_1(t)$) and may perform echo cancellation as described above to generate the residual audio data 335. For example, the first AEC component 320 may generate the first estimated echo audio data $y_1(t)$ using a first plurality of filter coefficient values that correspond to the first reference Ref1 $x_1(t)$. Thus, the first AEC component 320 may use the residual audio data 335 to perform adaptation processing to update only the first plurality of filter coefficient values.

In addition, the second AEC component 340 may receive a second portion of the reference audio data $x_r(t)$ 310 (e.g., second reference Ref2 $x_2(t)$) and may perform echo cancellation to generate output audio data 355. Thus, the second AEC component 340 may generate second estimated echo audio data $y_2(t)$ 345 corresponding to an estimate of a second echo signal received by the microphone(s) 112. For example, the second AEC component 340 may generate the second estimated echo audio data $y_2(t)$ using a second plurality of filter coefficient values that correspond to the second reference Ref2 $x_2(t)$.

Using the second plurality of filter coefficient values, the second AEC component 340 may generate the second estimated echo audio data 345 by multiplying each individual filter coefficient value by a corresponding portion of the second reference Ref2 $x_2(t)$. For example, a first AEC filter coefficient value may be associated with a first portion of the second reference signal that is within a first frequency band $\omega_1$, a second AEC filter coefficient value may be associated with a second portion of the second reference signal that is within a second frequency band $\omega_2$, and so on.

A canceler component 350 may subtract the second estimated echo audio data $y_2(t)$ 345 from the residual audio data r(t) 335 to generate the output audio data e(t) 355. Thus, the device 110 may perform echo cancellation to remove the second echo signal from the residual audio data r(t) 335 and generate the output audio data 355. While FIG. 3B illustrates the canceler component 350 separate from the second AEC component 340, the disclosure is not limited thereto and the second AEC component 340 may include the canceler component 350 without departing from the disclosure.

The second AEC component 320 may use the output audio data e(t) 355 to perform adaptation processing to update the second plurality of filter coefficient values. By separating the echo cancellation into two stages, the first AEC component 320 may adapt the first plurality of filter coefficient values separately from the second AEC component 340 adapting the second plurality of filter coefficient values, improving an audio quality of the output audio data e(t) 355.

FIG. 4 illustrates example reference audio signals according to embodiments of the present disclosure. As illustrated in FIG. 4, a playback chart 400 represents a plurality of reference signals over a frequency range from 3 Hz to 20 kHz. For example, the playback chart 400 includes a woofer signal 410, three midrange signals 420, and a tweeter signal 430.

The woofer signal 410 is a first reference signal that may correspond to a first loudspeaker configured to output audio in a woofer frequency range. For example, the woofer frequency range may extend from 20 Hz to 700 Hz or so, with strong energy values between 20 Hz and 400 Hz, weak energy values below 20 Hz and between 400 Hz and 700 Hz, and very weak energy values in frequency ranges higher than 700 Hz. However, these frequency ranges are provided to conceptually illustrate an example implementation and the disclosure is not limited thereto. Instead, the woofer frequency range may vary without departing from the disclosure.

The three midrange signals 420 may include a second reference signal that may correspond to a second loudspeaker configured to output audio in a midrange frequency range, a third reference signal that may correspond to a third loudspeaker configured to output audio in the midrange frequency range, and a fourth reference signal that may correspond to a fourth loudspeaker configured to output audio in the midrange frequency range. For example, the midrange frequency range may extend from 100 Hz to 20 kHz, with strong energy values between 200 Hz and 10 kHz, weak energy values between 100 Hz and 200 Hz and between 10 kHz and 20 kHz, and very weak energy values in frequency ranges lower than 100 Hz or higher than 20 kHz. However, these frequency ranges are provided to conceptually illustrate an example implementation and the disclosure is not limited thereto. Instead, the midrange frequency range may vary without departing from the disclosure.

The tweeter signal 430 is a fifth reference signal that may correspond to a fifth loudspeaker configured to output audio in a tweeter frequency range. For example, the tweeter frequency range may extend from 1500 Hz to 20 kHz, with strong energy values between 2500 Hz and 10 kHz, weak energy values between 1500 Hz and 2500 Hz and between 10 kHz and 20 kHz, and very weak energy values in frequency ranges lower than 1500 Hz or higher than 20 kHz. However, these frequency ranges are provided to conceptually illustrate an example implementation and the disclosure is not limited thereto. Instead, the tweeter frequency range may vary without departing from the disclosure.

The playback chart 400 represents a magnitude of energy values for each of the reference audio signals at different frequencies. Thus, the horizontal axis (e.g., x axis) indicates a frequency in Hertz (Hz), while the vertical axis (e.g., y axis) indicates a corresponding magnitude in decibels (dB). By comparing energy values associated with the reference audio signals within different frequency ranges, the device 110 may group the reference audio signals based on relative magnitude and determine whether to perform parallel echo cancellation 300 or cascade echo cancellation 305 for individual frequency ranges.

To illustrate an example, the device 110 may determine that the woofer signal 410 has very strong energy values relative to the midrange signals 420 and the tweeter signal 430 between 20 Hz and 100 Hz. For example, the woofer signal 410 is above −60 dB throughout this frequency range, whereas the midrange signals 420 are between −80 and −100 dB and the tweeter signal 430 is below −120 dB. Thus, the device 110 may separate the woofer signal 410 from the other reference audio signals within this frequency range.

In some examples, the device 110 may determine a first energy value (e.g., −50 dB) associated with a portion of the woofer signal 410 within a first frequency range (e.g., 20 Hz to 100 Hz), determine a second energy value (e.g., −90 dB) associated with a portion of the midrange signals 420 within the first frequency range, and determine a first difference between the first energy value and the second energy value. Within the first frequency range, the device 110 may determine that the first difference exceeds a threshold difference value (e.g., 10 dB, although the disclosure is not limited thereto) and separate the woofer signal 410 from the midrange signals 420. In addition, the device 110 may determine a third energy value (e.g., −120 dB) associated with a portion of the tweeter signals 430 within the first frequency range and determine a second difference between the second energy value and the third energy value. Within the first frequency range, the device 110 may determine that the second difference exceeds the threshold difference value and separate the midrange signals 420 from the tweeter signal 430. Thus, the device 110 may group the reference audio signals into three separate groups within the first frequency range. The device 110 may process each group of reference audio signals in parallel, while processing the distinct groups using a cascade configuration. For example, a first stage may perform echo cancellation on the woofer signal 410, a second stage may perform echo cancellation on the midrange signals 420 in parallel, and a third stage may perform echo cancellation on the tweeter signal 430.

In addition to grouping the reference audio signals, the device 110 may determine whether to ignore some of the reference audio signals due to the energy values being below a minimum threshold value. For example, the device 110 may determine that the second energy value and the third energy value are below a first minimum threshold value (e.g., −70 dB) and therefore ignore the midrange signals 420 and the tweeter signal 430 within the first frequency range. In some examples, the minimum threshold value may vary based on frequency and/or the reference audio signal without departing from the disclosure. For example, the device 110 may use the first minimum threshold value for the first frequency range and use a second minimum threshold value (e.g., −100 dB) for a second frequency range. Additionally or alternatively, the device 110 may use the first minimum threshold value for the midrange signals 420 and use the second minimum threshold value for the tweeter signal 430.

FIG. 5 illustrates examples of relative energy values within different frequency ranges according to embodiments of the present disclosure. As illustrated in FIG. 5, the device 110 may process the playback chart 410 to group the reference audio signals and determine an echo cancellation configuration within individual frequency ranges. For example, the device 110 may generate configuration data 500 indicating which reference signals to use during echo cancellation within each frequency range as well as whether to use a parallel or cascade configuration. Depending on the energy values associated with an individual frequency range, the device 110 may perform echo cancellation using a single reference signal, using multiple reference signals in a single stage, and/or may using multiple reference signals in two or more stages using a cascade configuration.

As illustrated in FIG. 5, the device 110 may determine that the woofer 510 corresponds to a woofer frequency range 515 between 20 Hz and 700 Hz. For example, the woofer 510 is dominant between 20 Hz and 250 Hz (e.g., a first stage processes only the woofer 510), is co-dominant with the midrange 520 between 250 Hz and 500 Hz (e.g., the first stage processes the woofer 510 and the midrange 520 in parallel), is dominated by the midrange 520 between 500 Hz and 700 Hz (e.g., the first stage processes the midrange 520 and a second stage processes the woofer 510), and can be ignored above 700 Hz (e.g., the device 110 does not perform echo cancellation on the woofer 510).

The device 110 may determine that the midrange 520 corresponds to a midrange frequency range 525 between 100 Hz and 20 kHz. For example, the midrange 520 can be ignored below 100 Hz (e.g., the device 110 does not perform echo cancellation on the midrange 520), is dominated by the woofer 510 between 100 Hz and 250 Hz (e.g., the first stage processes the woofer 510 and the second stage processes the midrange 520), is co-dominant with the woofer 510 between 250 Hz and 500 Hz (e.g., the first stage processes the woofer 510 and the midrange 520 in parallel), is dominant between 500 Hz and 2500 Hz (e.g., the first stage processes only the midrange 510), and is co-dominant with tweeter 530 between 2500 Hz and 20 kHz (e.g., the first stage processes the midrange 520 and the tweeter 530 in parallel).

The device 110 may determine that the tweeter 530 corresponds to a tweeter frequency range 535 between 1500 Hz and 20 kHz. For example, the tweeter 530 can be ignored below 1500 Hz (e.g., the device 110 does not perform echo cancellation on the tweeter 530), is dominated by the midrange 520 between 1500 Hz and 2500 Hz (e.g., the first stage processes the midrange 520 and the second stage processes the tweeter 530), and is co-dominant with the midrange 520 between 2500 Hz and 20 kHz (e.g., the first stage processes the midrange 520 and the tweeter 530 in parallel).

While FIG. 5 illustrates examples of grouping the reference audio signals and determining an echo cancellation configuration for individual frequency ranges, this is intended to conceptually illustrate the concept and the disclosure is not limited thereto. Instead, the frequency ranges, the groupings, and/or the configurations may vary without departing from the disclosure.

In some examples, the device 110 may dynamically determine how to group the reference audio signals and/or the echo cancellation configuration during run-time (e.g., while generating output audio). For example, the device 110 may perform the steps described above based on current reference audio signals being sent to the loudspeakers 114 to determine how to group the reference audio signals and/or the echo cancellation configuration for individual frequency ranges. However, the disclosure is not limited thereto, and in other examples the device 110 may store configuration data indicating how to group the reference audio signals and/or the echo cancellation configuration corresponding to individual frequency ranges without departing from the disclosure. Thus, the device 110 may store a fixed configuration and process the reference audio signals within individual frequency ranges using the fixed configuration, regardless of the relative energy values associated with the reference audio signals.

FIGS. 6A-6B illustrate examples of echo cancellation configurations within different frequency ranges according to embodiments of the present disclosure. Based on the playback chart 400, the device 110 may generate the configuration data 500 described above, and may use the configuration data 500 to determine the echo cancellation configurations for each individual frequency range.

FIG. 6A illustrates examples of the echo cancellation configurations within each frequency range based on the configuration data 500. For example, the configuration data 500 may generate seven distinct configurations, with a first configuration 610 corresponding to a first frequency range between 20 Hz and 100 Hz, a second configuration 620 corresponding to a second frequency range between 100 Hz and 250 Hz, a third configuration 630 corresponding to a third frequency range between 250 Hz and 500 Hz, a fourth configuration 640 corresponding to a fourth frequency range between 500 Hz and 700 Hz, a fifth configuration 650 corresponding to a fifth frequency range between 700 Hz and 1500 Hz, a sixth configuration 660 corresponding to a sixth frequency range between 1500 Hz and 2500 Hz, and a seventh configuration 670 corresponding to a seventh frequency range between 2500 Hz and 8000 Hz. In some examples, the seventh frequency range may extend to a higher frequency, such as 20 kHz, although the disclosure is not limited thereto and the device 110 may generate an eighth configuration (not illustrated) corresponding to an eighth frequency range above 8000 Hz. While the examples described above refer to specific frequency ranges, this is intended to conceptually illustrate a single example and the disclosure is not limited thereto. Instead, the number of configurations (e.g., distinct frequency ranges) and/or the specific frequency ranges (e.g., lower value and upper value for an individual frequency range) may vary without departing from the disclosure.

As illustrated in FIG. 6A, the first configuration 610 (e.g., first frequency range between 20 Hz and 100 Hz) may correspond to a single AEC component that performs echo cancellation using the woofer signal (e.g., single stage). For example, the midrange signals and a tweeter signal 606 may be below a minimum threshold value and can be ignored.

As illustrated in FIGS. 6A-6B, the second configuration 620 (e.g., second frequency range between 100 Hz and 250 Hz) may correspond to a cascade configuration including a first AEC component 622 that performs first echo cancellation processing using the woofer signal 602 (e.g., first stage) and a second AEC component 624 (e.g., MCAEC) that performs second echo cancellation processing using the midrange signals 604 in parallel (e.g., second stage). For example, the midrange signals 604 may be significant (e.g., higher than the minimum threshold value) but much weaker than the woofer signal 602 (e.g., difference between energy values above a difference value threshold), so the device 110 may use the cascade configuration to improve echo cancellation associated with the midrange signals 604.

As illustrated in FIGS. 6A-6B, the third configuration 630 (e.g., third frequency range between 250 Hz and 500 Hz) may correspond to a single AEC component 632 (e.g., MCAEC) that performs echo cancellation using the woofer signal 602 and the midrange signals 604 in parallel (e.g., single stage). For example, the woofer signal 602 and the midrange signals 604 may be similar (e.g., difference between energy values below the difference value threshold), while the tweeter signal 606 is still below the minimum threshold value and can be ignored.

As illustrated in FIGS. 6A-6B, the fourth configuration 640 (e.g., fourth frequency range between 500 Hz and 700 Hz) may correspond to a cascade configuration including a first AEC component 642 (e.g., MCAEC) that performs first echo cancellation processing using the midrange signals 604 in parallel (e.g., first stage) and a second AEC component 644 that performs second echo cancellation processing using the woofer signal 602 (e.g., second stage). For example, the woofer signal 602 may be significant (e.g., energy value above the minimum threshold value) but noticeably lower than the midrange signals 604 (e.g., difference between energy values above the difference threshold value). Thus, the device 110 may use the cascade configuration to improve echo cancellation associated with the woofer signal 602.

As illustrated in FIGS. 6A-6B, the fifth configuration 650 (e.g., fifth frequency range between 700 Hz and 1500 Hz) may correspond to a single AEC component 652 (e.g., MCAEC) that performs echo cancellation using the midrange signals 604 in parallel (e.g., single stage). For example, the woofer signal 602 and the tweeter signal 606 may be below the minimum threshold value and can be ignored.

As illustrated in FIGS. 6A-6B, the sixth configuration 660 (e.g., sixth frequency range between 1500 Hz and 2500 Hz) may correspond to a cascade configuration including a first AEC component 662 (e.g., MCAEC) that performs first echo cancellation processing using the midrange signals 604 in parallel (e.g., first stage) and a second AEC component 664 that performs second echo cancellation processing using the tweeter signal 606 (e.g., second stage). For example, the tweeter signal 606 may be significant (e.g., energy value above the minimum threshold value) but noticeably lower than the midrange signals 604 (e.g., difference between energy values above the difference threshold value). Thus, the device 110 may use the cascade configuration to improve echo cancellation associated with the tweeter signal 606.

As illustrated in FIGS. 6A-6B, the seventh configuration 670 (e.g., seventh frequency range between 2500 Hz and 8000 Hz) may correspond to a single AEC component 672 (e.g., MCAEC) that performs echo cancellation using the midrange signals 604 and the tweeter signal 606 in parallel (e.g., single stage). For example, the midrange signals 604 and the tweeter signal 606 may similar (e.g., difference between energy values below the difference value threshold), while the woofer signal 602 is below the minimum threshold value and can be ignored.

FIG. 7 illustrates examples of double cascade echo cancellation according to embodiments of the present disclosure. While the examples illustrated in FIGS. 4-6B correspond to a two-stage cascade configuration, the disclosure is not limited thereto. Instead, the device 110 may determine that the reference signals correspond to three distinct groups and may generate a three-stage cascade configuration without departing from the disclosure.

As illustrated in FIG. 7, double cascade echo cancellation processing 700 may include the first AEC component 320 and the second AEC component 340 described above with regard to FIG. 3B. As these components are described above with regard to FIGS. 3A-3B, a duplicate description is omitted. As illustrated in FIG. 7, the first AEC component 320 may perform first echo cancellation using a first reference Ref1 $x_1(t)$ of reference audio data 710. For example, the first AEC component 320 may use a first plurality of filter coefficient values to generate first estimated echo audio data 325 and the canceler 330 may subtract the first estimated echo audio data 325 from the microphone audio data 315 to generate first residual audio data 335. The first AEC component 320 may then use the first residual audio data 335 to perform adaptation processing on the first plurality of filter coefficient values.

The second AEC component 340 may perform second echo cancellation using a second reference Ref2 $x_2(t)$ of the reference audio data 710. For example, the second AEC component 340 may use a second plurality of filter coefficient values to generate second estimated echo audio data 345 and the canceler 350 may subtract the second estimated echo audio data 345 from the first residual audio data 335 to generate second residual audio data 755. The second AEC component 340 may then use the second residual audio data 755 to perform adaptation processing on the second plurality of filter coefficient values.

A third AEC component 760 may perform third echo cancellation using a third reference Ref3 $x_3(t)$ of the reference audio data 710. For example, the third AEC component 760 may use a third plurality of filter coefficient values to generate third estimated echo audio data 765 and a canceler 770 may subtract the third estimated echo audio data 765 from the second residual audio data 755 to generate output audio data 775. The third AEC component 760 may then use the output audio data 775 to perform adaptation processing on the third plurality of filter coefficient values.

Figure 8:
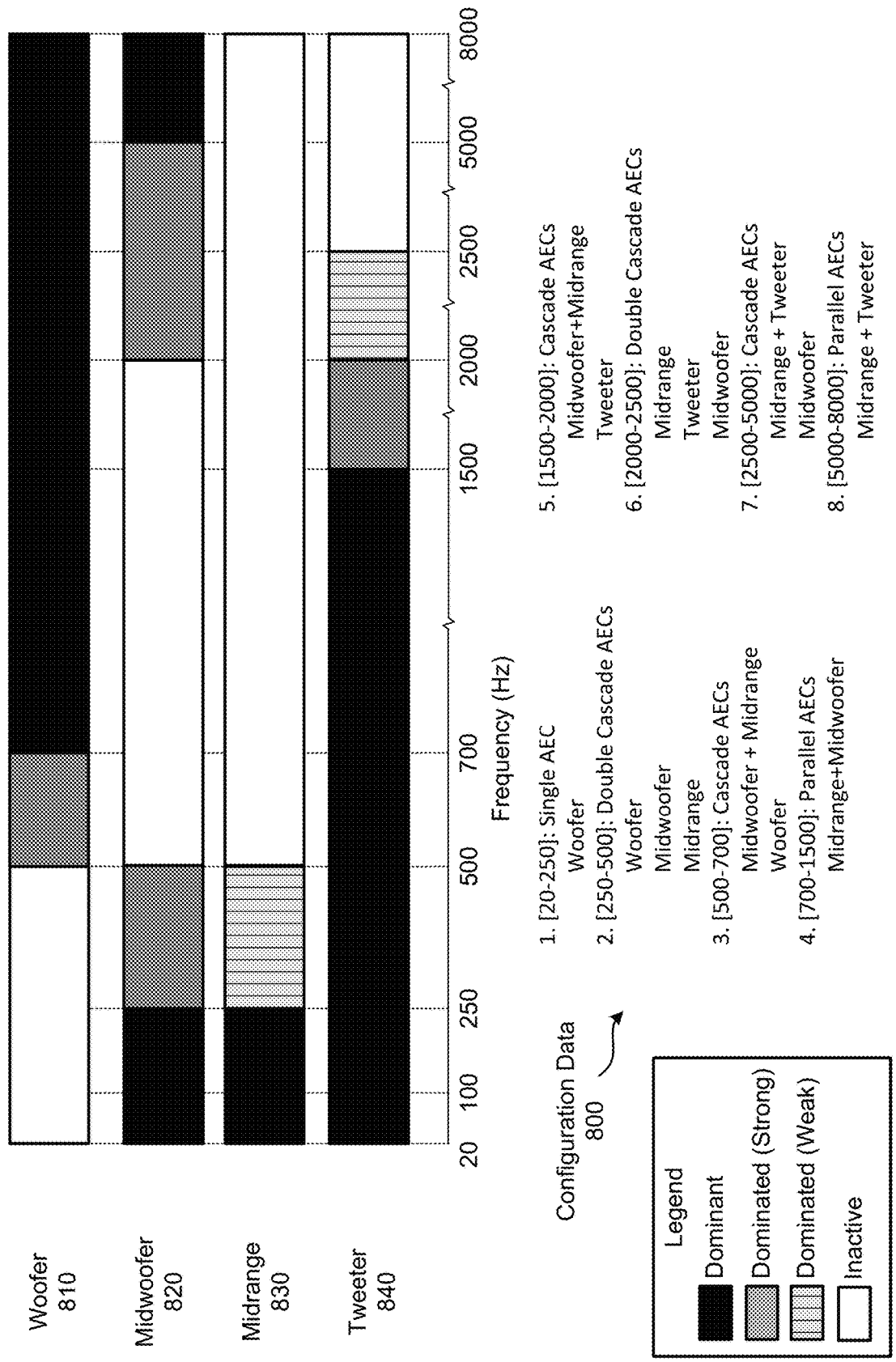
FIG. 8 illustrates examples of relative energy values within different frequency ranges according to embodiments of the present disclosure.

FIG. 8 illustrates examples of relative energy values within different frequency ranges according to embodiments of the present disclosure. To illustrate a double cascade configuration, FIG. 8 illustrates an example that includes an additional reference signal corresponding to a midwoofer (e.g., loudspeaker configured to generate output audio in a midwoofer frequency range). The disclosure is not limited thereto, and the device 110 may distinguish between the midrange signals and/or include additional reference signals without departing from the disclosure.

As illustrated in FIG. 8, the device 110 may group the reference audio signals and determine an echo cancellation configuration within individual frequency ranges. For example, the device 110 may generate configuration data 800 indicating which reference signals to use during echo cancellation within each frequency range as well as whether to use a parallel or cascade configuration. Depending on the energy values associated with an individual frequency range, the device 110 may perform echo cancellation using a single reference signal, using multiple reference signals in a single stage, using two reference signals in two stages using a cascade configuration, and/or using three reference signals in three stages using a double cascade configuration.

As illustrated in FIG. 8, the device 110 may determine that the woofer 810 corresponds to a woofer frequency range 815 between 20 Hz and 700 Hz. For example, the woofer 810 is dominant between 20 Hz and 250 Hz (e.g., a first stage processes only the woofer 810), is co-dominant with the midrange 830 between 250 Hz and 500 Hz (e.g., the first stage processes the woofer 810 and the midrange 830 in parallel), is dominated by the midrange 830 between 500 Hz and 700 Hz (e.g., the first stage processes the midrange 830 and a second stage processes the woofer 810), and can be ignored above 700 Hz (e.g., the device 110 does not perform echo cancellation on the woofer 810).

As illustrated in FIG. 8, the device 110 may determine that the woofer 810 corresponds to a woofer frequency range between 20 Hz and 700 Hz. For example, the woofer 810 is dominant in a single stage configuration between 20 Hz and 250 Hz (e.g., a first stage processes only the woofer 810), is dominant in a three stage configuration between 250 Hz and 500 Hz (e.g., a first stage processes only the woofer 810, a second stage processes the midwoofer 820, and a third stage processes the midrange 830), is dominated by the midwoofer 820 and the midrange 830 in a two stage configuration between 500 Hz and 700 Hz (e.g., a first stage processes the midwoofer 820 and the midrange 830 in parallel and a second stage processes the woofer 810), and can be ignored above 700 Hz (e.g., the device 110 does not perform echo cancellation on the woofer 810).

The device 110 may determine that the midwoofer 820 corresponds to a midwoofer frequency range between 250 Hz and 5000 Hz. For example, the midwoofer 820 can be ignored below 250 Hz (e.g., the device 110 does not perform echo cancellation on the midwoofer 820), is dominated by the woofer 810 in a three stage configuration between 250 Hz and 500 Hz (e.g., a first stage processes the woofer 810, a second stage processes the midwoofer 820, and a third stage processes the midrange 830), is co-dominant with the midrange 830 in a two stage configuration between 500 Hz and 700 Hz (e.g., a first stage processes the midwoofer 820 and the midrange 830 in parallel while a second stage processes the woofer 810), is co-dominant with the midrange 830 in a single stage configuration between 700 Hz and 1500 Hz (e.g., a first stage processes the midwoofer 820 and the midrange 830 in parallel), is co-dominant with the midrange 830 in a two stage configuration between 1500 Hz and 2000 Hz (e.g., a first stage processes the midwoofer 820 and the midrange 830 in parallel, a second stage processes the tweeter 840), is dominated by the midrange 830 in a three stage configuration between 2000 Hz and 2500 Hz (e.g., a first stage processes the midrange 830, a second stage processes the midwoofer 820, and a third stage processes the tweeter 840), is dominated by the midrange 830 and the tweeter 840 in a two stage configuration between 2500 Hz and 5000 Hz (e.g., a first stage processes the midrange 830 and the tweeter 840 in parallel while a second stage processes the midwoofer 820), and can be ignored above 5000 Hz (e.g., the device 110 does not perform echo cancellation on the midwoofer 820).

The device 110 may determine that the midrange 830 corresponds to a midrange frequency range between 250 Hz and 20 kHz. For example, the midrange 830 can be ignored below 250 Hz (e.g., the device 110 does not perform echo cancellation on the midrange 830), is dominated by the woofer 810 and the midwoofer 820 in a three stage configuration between 250 Hz and 500 Hz (e.g., a first stage processes the woofer 810, a second stage processes the midwoofer 820, and a third stage processes the midrange 830), is co-dominant with the midwoofer 820 in a two stage configuration between 500 Hz and 700 Hz (e.g., a first stage processes the midwoofer 820 and the midrange 830 in parallel while a second stage processes the woofer 810), is co-dominant with the midwoofer 820 in a single stage configuration between 700 Hz and 1500 Hz (e.g., a first stage processes the midwoofer 820 and the midrange 830 in parallel), is co-dominant with the midwoofer 820 in a two stage configuration between 1500 Hz and 2000 Hz (e.g., a first stage processes the midwoofer 820 and the midrange 830 in parallel, a second stage processes the tweeter 840), is dominant in a three stage configuration between 2000 Hz and 2500 Hz (e.g., a first stage processes the midrange 830, a second stage processes the midwoofer 820, and a third stage processes the tweeter 840), is co-dominant with the tweeter 840 in a two stage configuration between 2500 Hz and 5000 Hz (e.g., a first stage processes the midrange 830 and the tweeter 840 in parallel while a second stage processes the midwoofer 820), and is co-dominant with the tweeter 840 in a single stage configuration between 5000 Hz and 20 kHz (e.g., a first stage processes the midrange 830 and the tweeter 840 in parallel).

The device 110 may determine that the tweeter 840 corresponds to a tweeter frequency range between 1500 Hz and 20 kHz. For example, the tweeter 840 can be ignored below 1500 Hz (e.g., the device 110 does not perform echo cancellation on the tweeter 840), is dominated by the midwoofer 820 and the midrange 830 in a two stage configuration between 1500 Hz and 2000 Hz (e.g., a first stage processes the midwoofer 820 and the midrange 830) and a second stage processes the tweeter 840), is dominated by the midwoofer 820 and the midrange 830 in a three stage configuration between 2000 Hz and 2500 Hz (e.g., a first stage processes the midrange 830, a second stage processes the midwoofer 820, and a third stage processes the tweeter 840), is co-dominant with the midrange 830 in a two stage configuration between 2500 Hz and 5000 Hz (e.g., a first stage processes the midrange 830 and the tweeter 840 in parallel while a second stage processes the midwoofer 820), and is co-dominant with the midrange 830 in a single stage configuration between 5000 Hz and 20 kHz (e.g., a first stage processes the midrange 830 and the tweeter 840 in parallel).

While FIG. 8 illustrates examples of grouping the reference audio signals and determining an echo cancellation configuration for individual frequency ranges, this is intended to conceptually illustrate the concept and the disclosure is not limited thereto. Instead, the frequency ranges, the groupings, and/or the configurations may vary without departing from the disclosure.

Figure 9:
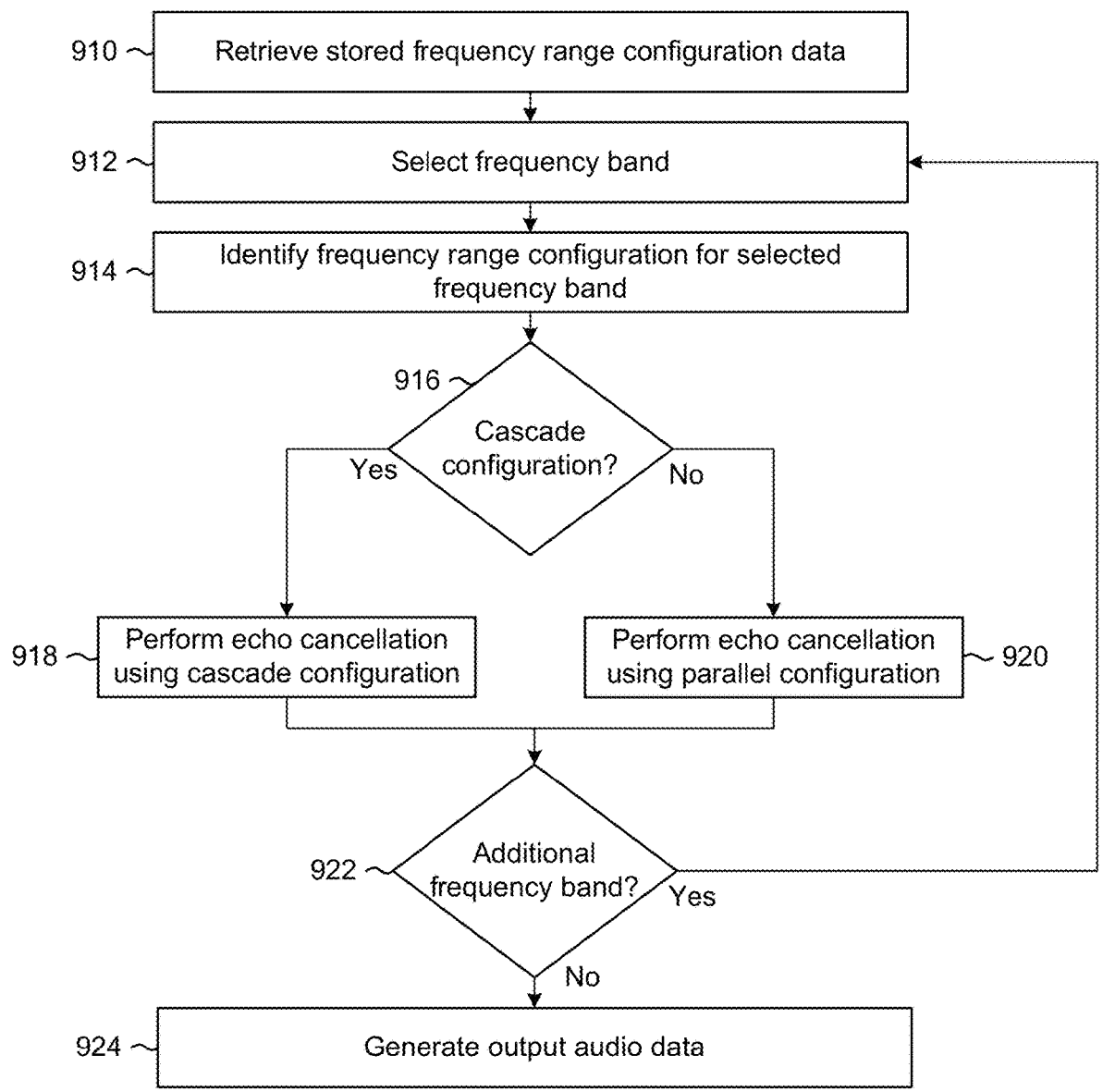
FIG. 9 is a flowchart conceptually illustrating an example method for performing echo cancellation according to embodiments of the present disclosure.

FIG. 9 is a flowchart conceptually illustrating an example method for performing echo cancellation according to embodiments of the present disclosure. In some examples, the device 110 may use a fixed configuration for individual frequency bands, without regard to relative energy levels between the reference audio signals. For example, the device 110 may always apply single stage echo cancellation for the woofer audio signal in a first frequency range (e.g., 20 Hz to 100 Hz), may always apply two-stage cascade echo cancellation for the woofer audio signal and the midrange audio signals in a second frequency range (e.g., 100 Hz to 250 Hz), may always apply single-stage parallel echo cancellation for the woofer audio signal and the midrange audio signals in a third frequency range (e.g., 250 Hz to 500 Hz), and so on.

As illustrated in FIG. 9, the device 110 may retrieve (910) stored frequency range configuration data, may select (912) a frequency band and may identify (914) a frequency range configuration (e.g., frequency range configuration data) for the selected frequency band (e.g., frequency range). For example, the device 110 may retrieve a lookup table that includes frequency range configuration data for each of the frequency bands and may apply individual frequency range configurations to a corresponding frequency band. As used herein, the frequency range configuration may be represented by the frequency range configuration data. For ease of illustration, these terms may be used interchangeably without departing from the disclosure.

The device 110 may determine (916), using the frequency range configuration for the selected frequency band, whether to use a cascade configuration. When the frequency range configuration indicates that the device 110 should use a cascade configuration, the device 110 may perform (918) echo cancellation using the cascade configuration. When the frequency range configuration indicates that the device 110 should not use a cascade configuration, the device 110 may perform (920) echo cancellation using a parallel configuration. The device 110 may then determine (922) whether there is an additional frequency band, and if so, may loop to step 912 and repeat steps 912-920 for the additional frequency band. If there isn't an additional frequency band, the device 110 may generate (924) output audio data based on the output signals generated while performing echo cancellation in steps 918-920.

While FIG. 9 illustrates an example of a the frequency range configuration indicating whether to perform echo cancellation using a cascade configuration or a parallel configuration, the disclosure is not limited thereto and the device 110 may perform echo cancellation using additional variations without departing from the disclosure. For example, the frequency range configuration data may indicate that the device 110 perform echo cancellation using a two-stage cascade configuration, a three-stage cascade configuration, and/or the like without departing from the disclosure. Additionally or alternatively, the frequency range configuration data may indicate that the device 110 perform echo cancellation using a parallel configuration for any individual stage of echo cancellation without departing from the disclosure. For example, a two-stage cascade configuration may include a single reference audio signal (e.g., woofer audio signal) in a first stage and may include multiple reference audio signals (e.g., multiple midrange audio signals) in a second stage without departing from the disclosure.

Figure 10:
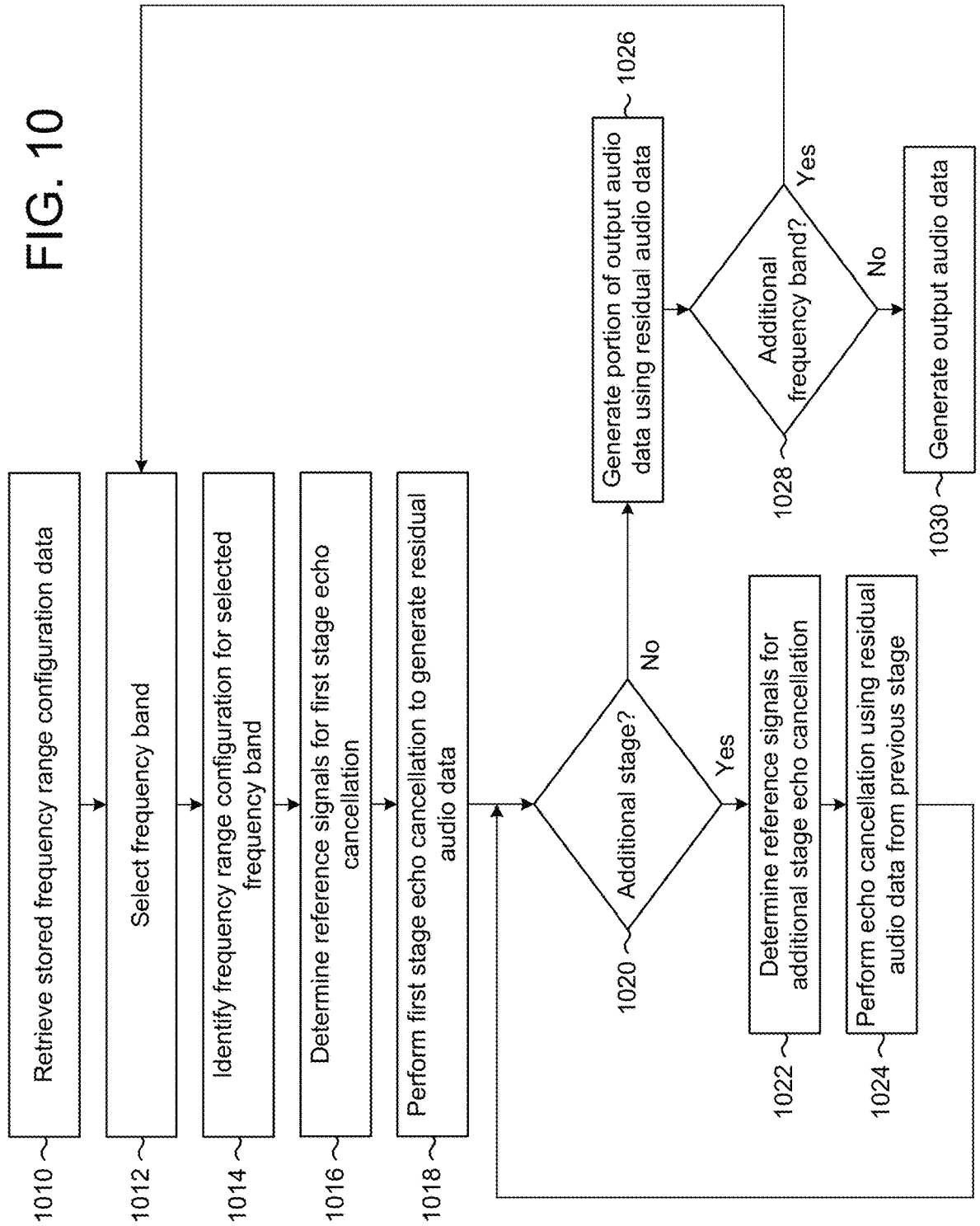
FIG. 10 is a flowchart conceptually illustrating an example method for performing cascaded echo cancellation using fixed configurations according to embodiments of the present disclosure.

FIG. 10 is a flowchart conceptually illustrating an example method for performing cascaded echo cancellation using fixed configurations according to embodiments of the present disclosure. As illustrated in FIG. 10, the device 110 may retrieve (1010) stored frequency range configuration data as described above with regard to FIG. 9. The device 110 may select (1012) a frequency band, may identify (1014) a frequency range configuration for the selected frequency band, may determine (1016) reference signals for first stage echo cancellation, and may perform (1018) first stage echo cancellation to generate residual audio data. For example, the device 110 may determine that the selected frequency band corresponds to two-stage echo cancellation, may determine that the first stage performs echo cancellation using a single reference signal (e.g., woofer signal), and may perform the first stage echo cancellation to remove the woofer signal and generate the residual audio data.

The device 110 may determine (1020) whether there is an additional stage of echo cancellation, and, if so, may determine (1022) reference signals for the additional stage of echo cancellation and perform (1024) echo cancellation using the residual audio data from the previous stage. For example, the device 110 may determine that the second stage performs echo cancellation using multiple reference signals (e.g., midrange signals) and may perform the second stage echo cancellation to remove the midrange signals from first residual audio data to generate second residual audio data (e.g., output from the second stage of echo cancellation). After the device 110 performs echo cancellation in step 1020, the device 110 may loop to step 1020 and determine whether there is an additional stage of echo cancellation.

If the device 110 determines that there is not an additional stage of echo cancellation in step 1020, the device 110 may generate (1026) a portion of output audio data using the residual audio data generated in step 1018 or 1024. For example, if there is a single stage of echo cancellation (e.g., only a first group of reference signals), the device 110 may generate the portion of the output audio data using the first residual audio data generated in step 1018. However, if there is a second stage of echo cancellation, the device 110 may generate the portion of the output audio data using the second residual audio data generated in 1024, and so on.

The device 110 may then determine (1028) whether there is an additional frequency band, and, if so, may loop to step 1012 and repeat steps 1012-1026 for the additional frequency band. If there is not an additional frequency band, the device 110 may generate (1030) the output audio data by combining the portions of audio data generated for individual frequency bands in step 1026.

Figure 11:
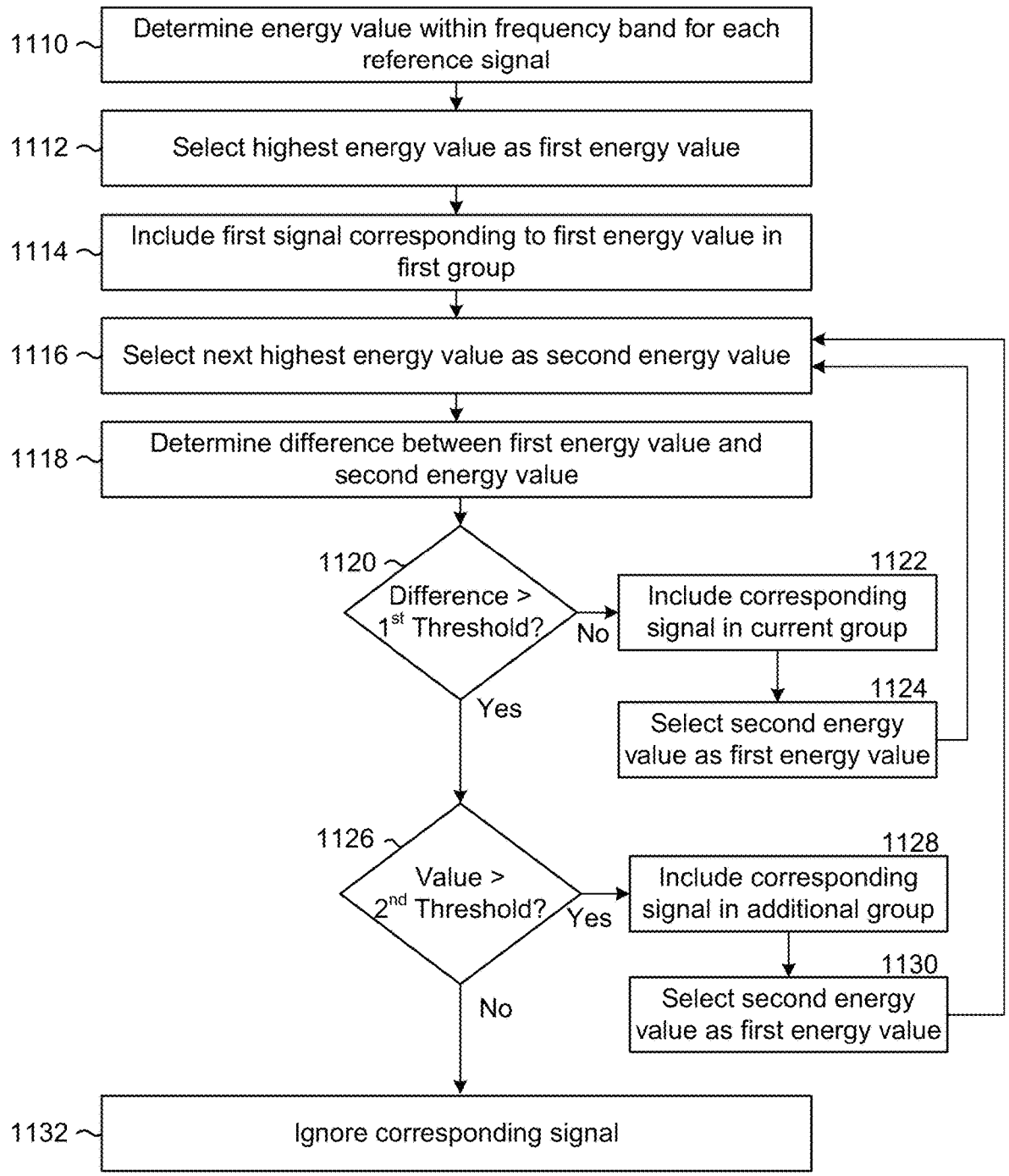
FIG. 11 is a flowchart conceptually illustrating an example method for performing grouping reference audio signals according to embodiments of the present disclosure.

FIG. 11 is a flowchart conceptually illustrating an example method for performing grouping reference audio signals according to embodiments of the present disclosure. As illustrated in FIG. 11, the device 110 may determine (1110) an energy value within an individual frequency band for each reference signal. For example, the device 110 may determine a plurality of energy values corresponding to a first frequency band, with the number of the plurality of energy values corresponding to the number of reference signals. To illustrate an example including one woofer reference signal, three midrange reference signals, and one tweeter reference signal, the device 110 may determine five energy values for each individual frequency band. However, the disclosure is not limited thereto and in some examples, the device 110 may not determine energy values for all of the reference signals without departing from the disclosure. For example, the device 110 may ignore the tweeter reference signal during a low frequency band and/or ignore the woofer reference signal during a high frequency band without departing from the disclosure. Additionally or alternatively, the device 110 may determine whether the energy values exceed a minimum threshold value and only determine the plurality of energy values for the reference signals that exceed the minimum threshold value without departing from the disclosure.

After determining the plurality of energy values for a frequency band, the device 110 may select (1112) a highest energy value as a first energy value and may include (1114) a first reference signal corresponding to the first energy value in a first group. The device 110 may then select (1116) a next highest energy value as a second energy value, determine (1118) a difference between the first energy value and the second energy value, and determine (1120) whether the difference exceeds a first threshold value.

If the difference does not exceed the first threshold value (e.g., the second energy value is within the threshold value of the first energy value, indicating that these reference signals should be included in the same group and processed in parallel), the device 110 may include (1122) a signal corresponding to the second energy value in the current group, select (1124) the second energy value as the first energy value, and loop to step 1116 to select a next highest energy value as the second energy value. Thus, the device 110 may repeat steps 1116-1124 until a difference between the first energy value and the second energy value exceeds the first threshold value.

When the difference exceeds the first threshold value in step 1120, the device 110 may determine (1126) whether the second energy value exceeds a second threshold value. For example, the second threshold value may indicate a minimum threshold value below which a reference audio signal is simply ignored during echo cancellation. If the second energy value exceeds the second threshold value, the device 110 may include (1128) a signal corresponding to the second energy value in an additional group (e.g., second stage), may select (1130) the second energy value as the first energy value, and may loop to step 1116 to select a next highest energy value as the second energy value. Thus, the device 110 may repeat steps 1116-1124 for the additional group (e.g., second stage) until a difference between the first energy value and the second energy value exceeds the first threshold value.

The device 110 may continue repeating steps 116-1130 until the device 110 has grouped all of the reference audio signals or the second energy value does not exceed the second threshold value in step 1126. When the second energy value does not exceed the second threshold value, the device 110 may ignore (1132) a corresponding signal. While not illustrated in FIG. 11, the device 110 may repeat these steps to group reference signals for each individual frequency band and then perform echo cancellation using the determined groups.

Figure 12:
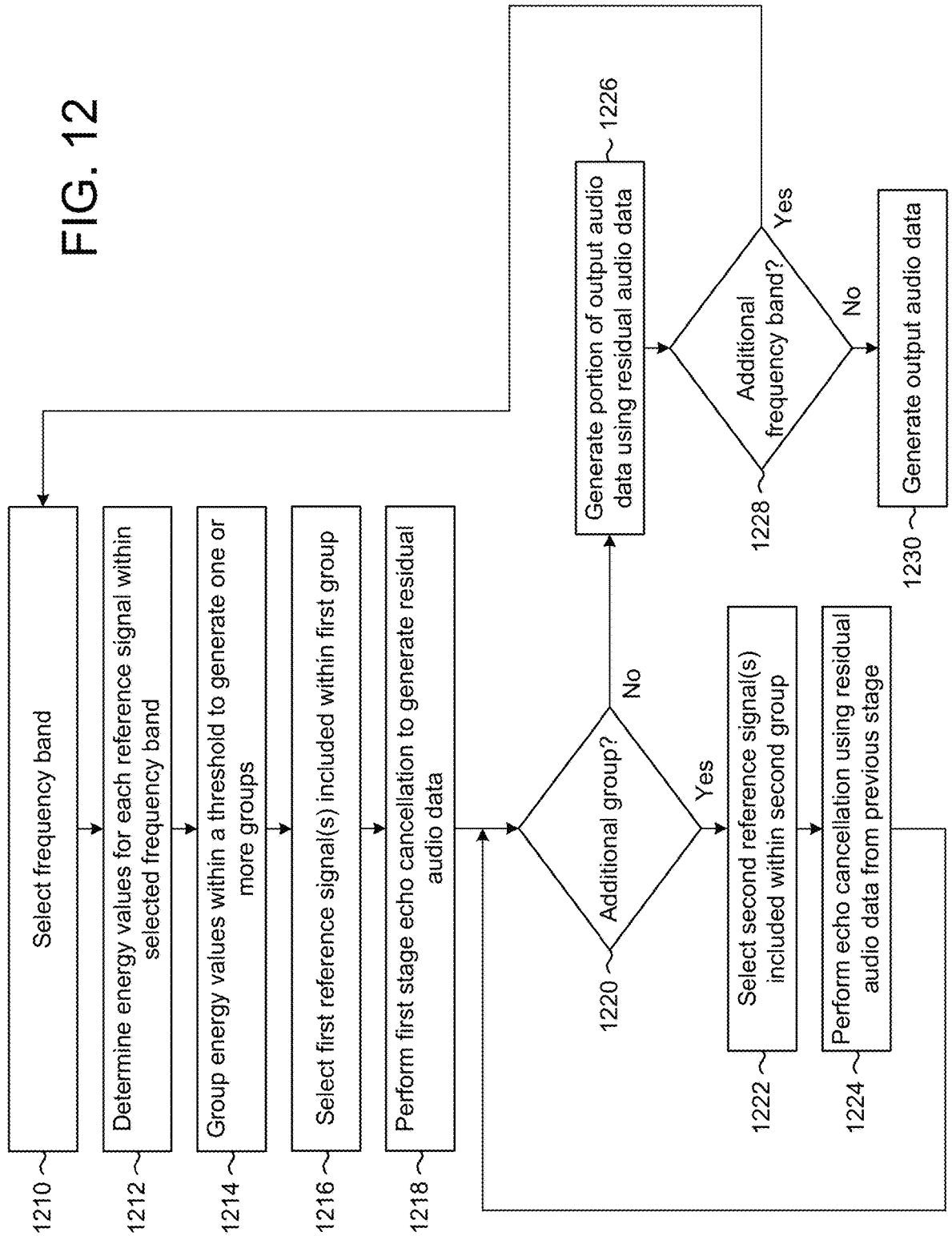
FIG. 12 is a flowchart conceptually illustrating an example method for performing cascaded echo cancellation using dynamic configurations according to embodiments of the present disclosure.

FIG. 12 is a flowchart conceptually illustrating an example method for performing cascaded echo cancellation using dynamic configurations according to embodiments of the present disclosure. As illustrated in FIG. 12, the device 110 may select (1210) a frequency band, determine (1212) energy values for each reference signal within the selected frequency band, and group (1214) energy values within a threshold to generate one or more groups, as described above with regard to FIG. 11.

The device 110 may select (1216) first reference signal(s) included within a first group and perform (1218) first stage echo cancellation to generate first residual audio data. For example, the device 110 may select one or more first reference signals that are included in the first group, may generate first estimated echo audio data using the one or more first reference signals and a first plurality of filter coefficient values, and may subtract the first estimated echo audio data from the microphone audio data to generate the first residual audio data. During the first stage echo cancellation, the device 110 may also adapt the first plurality of filter coefficient values to generate a second plurality of filter coefficient values.

The device 110 may determine (1220) whether there is an additional group of reference signal(s) and, if so, may select (1222) second reference signal(s) included within the second group and perform (1224) second echo cancellation using the residual audio data from the previous stage to generate additional residual audio data. For example, the device 110 may select one or more second reference signals that are included in the second group, may generate second estimated echo audio data using the one or more second reference signals and a third plurality of filter coefficient values, and may subtract the second estimated echo audio data from the first residual audio data to generate second residual audio data. During the second stage echo cancellation, the device 110 may also adapt the third plurality of filter coefficient values to generate a fourth plurality of filter coefficient values.

The device 110 may loop to step 1220 and determine whether there is an additional group. For each additional group, the device 110 may perform steps 1222-1224 using an additional stage of echo cancellation to generate additional residual audio data and adapt filter coefficients corresponding to the additional stage of echo cancellation. When the device 110 determines that there is not an additional group in step 1220, the device 110 may generate (1226) a portion of output audio data using the residual audio data generated in step 1218 or 1224. For example, if there is a single stage (e.g., only a first group of reference signals), the device 110 may generate the portion of the output audio data using the first residual audio data. However, if there is a second stage, the device 110 may generate the portion of the output audio data using the second residual audio data, and so on.

The device 110 may determine (1228) whether there is an additional frequency band, and, if so, may loop to step 1210 and repeat steps 1210-1226 for the additional frequency band. When the device 110 determines in step 1228 that there is not an additional frequency band, the device 110 may generate (1230) output audio data by combining the portions of the output audio data generated in step 1226 for each individual frequency band.

FIG. 13 is a block diagram conceptually illustrating example components of a system \ according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 116. The audio output device may be integrated into a single device or may be separate.

As illustrated in FIG. 13, the device 110 may include an address/data bus 1324 for conveying data among components of the device 110. Each component within the device 110 may also be directly connected to other components in addition to (or instead of) being connected to other components across the bus 1324.

The device 110 may include one or more controllers/processors 1304, which may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of memory. The device 110 may also include a data storage component 1308, for storing data and controller/processor-executable instructions (e.g., instructions to perform operations discussed herein). The data storage component 1308 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1302.

The device 110 includes input/output device interfaces 1302. A variety of components may be connected through the input/output device interfaces 1302. For example, the device 110 may include one or more microphone(s) 112 (e.g., a plurality of microphones 112 in a microphone array), one or more loudspeaker(s) 114, and/or a media source such as a digital media player (not illustrated) that connect through the input/output device interfaces 1302, although the disclosure is not limited thereto. Instead, the number of microphones 112 and/or the number of loudspeaker(s) 114 may vary without departing from the disclosure. In some examples, the microphones 112 and/or loudspeaker(s) 114 may be external to the device 110, although the disclosure is not limited thereto. The input/output interfaces 1302 may include A/D converters (not illustrated) and/or D/A converters (not illustrated).

The input/output device interfaces 1302 may also include an interface for an external peripheral device connection such as universal serial bus (USB), FireWire, Thunderbolt, Ethernet port or other connection protocol that may connect to network(s) 199.

The input/output device interfaces 1302 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1308 to be executed by controller(s)/processor(s) 1304 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1304, using the memory 1306 as temporary "working" storage at runtime. The computer instructions may be stored in a non-transitory manner in non-volatile memory 1306, storage 1308, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the components described above may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first reference audio data associated with a first loudspeaker corresponding to a device;
   receiving second reference audio data associated with a second loudspeaker corresponding to the device;
   receiving first audio data from at least one microphone of the device;
   determining that the first reference audio data represents a stronger signal than the second reference audio data;
   based at least in part on determining that the first reference audio data represents a stronger signal than the second reference audio data, generating second audio data by performing first echo cancellation using the first audio data and the first reference audio data; and
   based at least in part on determining that the first reference audio data represents a stronger signal than the second reference audio data, generating third audio data by performing second echo cancellation using the second audio data and the second reference audio data.

2. The computer-implemented method of claim 1, further comprising:
   determining a first energy value of a portion of the first reference audio data within a first frequency range; and
   determining a second energy value of a portion of the second reference audio data within the first frequency range,
   wherein determining that the first reference audio data represents a stronger signal than the second reference audio data comprises determining that a first difference between the first energy value and the second energy value satisfies a condition.

3. The computer-implemented method of claim 2, further comprising:
   receiving fourth audio data from the at least one microphone;
   determining a third energy value of a second portion of the first reference audio data within a second frequency range;
   determining a fourth energy value of a second portion of the second reference audio data within the second frequency range;
   determining that a second difference between the third energy value and the fourth energy value does not satisfy the condition; and
   generating fifth audio data using the fourth audio data, the second portion of the first reference audio data and the second portion of the second reference audio data.

4. The computer-implemented method of claim 1, wherein:
   the first echo cancellation is performed using a first plurality of filter coefficient values associated with a first echo canceller; and
   the second echo cancellation is performed using a second plurality of filter coefficient values associated with a second echo canceller.

5. The computer-implemented method of claim 4, further comprising:

generating a third plurality of filter coefficient values using the second audio data and the first plurality of filter coefficient values.

6. The computer-implemented method of claim 4, further comprising:
generating a third plurality of filter coefficient values using the third audio data and the second plurality of filter coefficient values.

7. The computer-implemented method of claim 1, further comprising:
receiving third reference audio data associated with the first loudspeaker;
receiving fourth reference audio data associated with the second loudspeaker;
receiving fourth audio data from the at least one microphone;
determining that a difference between the third reference audio data and the fourth reference audio data fails to satisfy a condition; and
generating fifth audio data by performing third echo cancellation using the fourth audio data, the third reference audio data, and the fourth reference audio data.

8. The computer-implemented method of claim 1, further comprising:
receiving third reference audio data associated with a third loudspeaker of the device; and
determining that a difference between the first reference audio data and the third reference audio data fails to satisfy a condition,
wherein performing the first echo cancellation comprises:
generating first estimated echo audio data using the first reference audio data and a first portion of a first plurality of filter coefficient values,
generating second estimated echo audio data using the third reference audio data and a second portion of the first plurality of filter coefficient values, and
generating the second audio data using the first audio data, the first estimated echo audio data, and the second estimated echo audio data.

9. The computer-implemented method of claim 8, wherein generating the second audio data comprises:
generating the second audio data by subtracting the first estimated echo audio data and the second estimated echo audio data from the first audio data.

10. The computer-implemented method of claim 1, further comprising:
receiving third reference audio data associated with the first loudspeaker;
receiving fourth reference audio data associated with the second loudspeaker;
receiving fourth audio data from the at least one microphone;
determining a first signal quality metric value of the third reference audio data;
determining a second signal quality metric value of the fourth reference audio data;
determining that the first signal quality metric value satisfies a condition;
determining that the second signal quality metric value fails to satisfy the condition; and
generating fifth audio data by performing third echo cancellation using the fourth audio data and the fourth reference audio data.

11. A system comprising:
at least one processor; and
memory including instructions operable to be executed by the at least one processor to cause the system to:
receive first reference audio data associated with a first loudspeaker corresponding to a device;
receive second reference audio data associated with a second loudspeaker corresponding to the device;
receive first audio data from at least one microphone of the device;
determine that the first reference audio data represents a stronger signal than the second reference audio data;
based at least in part on determining that the first reference audio data represents a stronger signal than the second reference audio data, generate second audio data by performing first echo cancellation using the first audio data and the first reference audio data; and
based at least in part on determining that the first reference audio data represents a stronger signal than the second reference audio data, generate third audio data by performing second echo cancellation using the second audio data and the second reference audio data.

12. The system of claim 11, wherein the memory further comprises instructions that, when executed by the at least one processor, further cause the system to:
determine a first energy value of a portion of the first reference audio data within a first frequency range; and
determine a second energy value of a portion of the second reference audio data within the first frequency range,
wherein the instructions that cause the system to determine that the first reference audio data represents a stronger signal than the second reference audio data comprise instructions that, when executed by the at least one processor, further cause the system to determine that a first difference between the first energy value and the second energy value satisfies a condition.

13. The system of claim 12, wherein the memory further comprises instructions that, when executed by the at least one processor, further cause the system to:
receive fourth audio data from the at least one microphone;
determine a third energy value of a second portion of the first reference audio data within a second frequency range;
determine a fourth energy value of a second portion of the second reference audio data within the second frequency range;
determine that a second difference between the third energy value and the fourth energy value does not satisfy the condition; and
generate fifth audio data using the fourth audio data, the second portion of the first reference audio data and the second portion of the second reference audio data.

14. The system of claim 11, wherein:
the first echo cancellation is performed using a first plurality of filter coefficient values associated with a first echo canceller; and
the second echo cancellation is performed using a second plurality of filter coefficient values associated with a second echo canceller.

15. The system of claim 14, wherein the memory further comprises instructions that, when executed by the at least one processor, further cause the system to:

generate a third plurality of filter coefficient values using the second audio data and the first plurality of filter coefficient values.

16. The system of claim 14, wherein the memory further comprises instructions that, when executed by the at least one processor, further cause the system to:
generate a third plurality of filter coefficient values using the third audio data and the second plurality of filter coefficient values.

17. The system of claim 11, wherein the memory further comprises instructions that, when executed by the at least one processor, further cause the system to:
receive third reference audio data associated with the first loudspeaker;
receive fourth reference audio data associated with the second loudspeaker;
receive fourth audio data from the at least one microphone;
determine that a difference between the third reference audio data and the fourth reference audio data fails to satisfy a condition; and
generate fifth audio data by performing third echo cancellation using the fourth audio data, the third reference audio data, and the fourth reference audio data.

18. The system of claim 11, wherein the memory further comprises instructions that, when executed by the at least one processor, further cause the system to:
receive third reference audio data associated with a third loudspeaker of the device; and
determine that a difference between the first reference audio data and the third reference audio data fails to satisfy a condition,
wherein the instructions that cause the system to perform the first echo cancellation comprise instructions that, when executed by the at least one processor, further cause the system to:
generate first estimated echo audio data using the first reference audio data and a first portion of a first plurality of filter coefficient values,
generate second estimated echo audio data using the third reference audio data and a second portion of the first plurality of filter coefficient values, and
generate the second audio data using the first audio data, the first estimated echo audio data, and the second estimated echo audio data.

19. The system of claim 18, wherein the instructions that cause the system to generate the second audio data comprise instructions that, when executed by the at least one processor, further cause the system to:
generate the second audio data by subtracting the first estimated echo audio data and the second estimated echo audio data from the first audio data.

20. The system of claim 11, wherein the memory further comprises instructions that, when executed by the at least one processor, further cause the system to:
receive third reference audio data associated with the first loudspeaker;
receive fourth reference audio data associated with the second loudspeaker;
receive fourth audio data from the at least one microphone;
determine a first signal quality metric value of the third reference audio data;
determine a second signal quality metric value of the fourth reference audio data;
determine that the first signal quality metric value satisfies a condition;
determine that the second signal quality metric value fails to satisfy the condition; and
generate fifth audio data by performing third echo cancellation using the fourth audio data and the fourth reference audio data.

* * * * *